US010498653B2

(12) United States Patent
Cook et al.

(10) Patent No.: US 10,498,653 B2
(45) Date of Patent: Dec. 3, 2019

(54) ENCRYPTION PRIORITIZATION FOR DISTRIBUTED STREAMING APPLICATIONS

(71) Applicant: International Business Machines Corporation, Armonk, NY (US)

(72) Inventors: Alexander Cook, Chaska, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/788,437

(22) Filed: Oct. 19, 2017

(65) Prior Publication Data
US 2019/0124007 A1 Apr. 25, 2019

(51) Int. Cl.
*G06F 15/16* (2006.01)
*H04L 12/801* (2013.01)
*H04L 29/06* (2006.01)

(52) U.S. Cl.
CPC .......... *H04L 47/12* (2013.01); *H04L 63/0428* (2013.01); *H04L 65/4069* (2013.01); *H04L 65/80* (2013.01)

(58) Field of Classification Search
CPC .. H04L 47/12; H04L 63/0428; H04L 65/4069
USPC ........................................................ 709/231
See application file for complete search history.

(56) References Cited

U.S. PATENT DOCUMENTS

| 7,124,303 | B2 | 10/2006 | Candelore et al. |
| 7,165,175 | B1 | 1/2007 | Kollmyer et al. |
| 7,167,560 | B2 | 1/2007 | Yu |
| 8,341,732 | B2 * | 12/2012 | Croft ............... G06F 3/1415 726/21 |
| 9,078,015 | B2 | 7/2015 | Kar et al. |

(Continued)

OTHER PUBLICATIONS

Ayshwarya, Partial Encryption and Partial Inference Control Based Disclosure in Effective Cost Cloud, International Journal of Computer Science and Engineering, vol. 3, Issue 3, May 2014, pp. 171-178.

(Continued)

*Primary Examiner* — Kristie D Shingles
(74) *Attorney, Agent, or Firm* — Patterson + Sheridan, LLP

(57) ABSTRACT

Aspects of present disclosure include a computer implemented method, system, and computer program product for implementing an encryption policy in a stream computing environment. The method includes: monitoring a plurality of stream operators within a stream computing environment to collect performance data, identifying a point of congestion within the stream computing environment, based on one or more values within the collected performance data satisfying a predefined congestion condition, determining one or more stream operators of the plurality of stream operators associated with the identified point of congestion, redeploying the one or more stream operators to an isolated network within the computing environment, and modifying an encryption policy for the stream computing environment to disable one or more encryption operations on the redeployed one or more stream operators.

20 Claims, 11 Drawing Sheets

(56) References Cited

U.S. PATENT DOCUMENTS

2016/0248676 A1* 8/2016 Thanasekaran ......... H04L 47/12

OTHER PUBLICATIONS

Jawad et al., "A review of color image encryption techniques." International Journal of Computer Science Issues 10.6 (2013): 266-275.

Che, "Designing and Implementing Kiwi: A Secure Distributed File System over HTTPS." Computer Science Department, Stanford University (2001).

Mattsson, "Continuous Protection of Enterprise Data—A Comprehensive Approach." Available at SSRN 940287, (2006).

* cited by examiner

ENCRYPTION PRIORITIZATION FOR DISTRIBUTED STREAMING APPLICATIONS

I. BACKGROUND

1. Field of the Invention

The present disclosure relates generally to the field of stream computing, and more particularly to computing applications that receive streaming data and process the data as it is received.

2. Related Art

Database management systems are typically configured to separate the process of storing data from accessing, manipulating, or using data stored in a database. More specifically, database management systems use a model in which data is first stored and indexed in a memory before subsequent querying and analysis. In general, database management systems may not be well suited for performing real-time processing and analyzing streaming data. In particular, database systems can be unable to store, index, and analyze large amounts of streaming data efficiently or in real-time.

II. SUMMARY

One aspect of the present disclosure discloses a computer implemented method that includes: monitoring a plurality of stream operators within a stream computing environment to collect performance data, identifying a point of congestion within the stream computing environment, based on one or more values within the collected performance data satisfying a predefined congestion condition, determining one or more stream operators of the plurality of stream operators associated with the identified point of congestion, redeploying the one or more stream operators to an isolated network within the computing environment, and modifying an encryption policy for the stream computing environment to disable one or more encryption operations on the redeployed one or more stream operators.

Another aspect of the present disclosure discloses a system that includes: a computing device having a processor, and a computer readable storage medium having program instructions embodied therewith, the program instructions executable by the processor to cause the system to: monitor a plurality of stream operators within a stream computing environment to collect performance data, identify a point of congestion within the stream computing environment, based on one or more values within the collected performance data satisfying a predefined congestion condition, determine one or more stream operators of the plurality of stream operators associated with the identified point of congestion, redeploy the one or more stream operators to an isolated network within the computing environment, and modify an encryption policy for the stream computing environment to disable one or more encryption operations on the redeployed one or more stream operators.

Another aspect of the present disclosure discloses a computer program product including a computer readable storage medium having program instructions embodied therewith, the program instructions executable by a computing device to cause the computing device to perform an operation. The operation includes monitoring a plurality of stream operators within a stream computing environment to collect performance data, identifying a point of congestion within the stream computing environment, based on one or more values within the collected performance data satisfying a predefined congestion condition, determining one or more stream operators of the plurality of stream operators associated with the identified point of congestion, redeploying the one or more stream operators to an isolated network within the computing environment, and modifying an encryption policy for the stream computing environment to disable one or more encryption operations on the redeployed one or more stream operators.

III. BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

Figure 1:
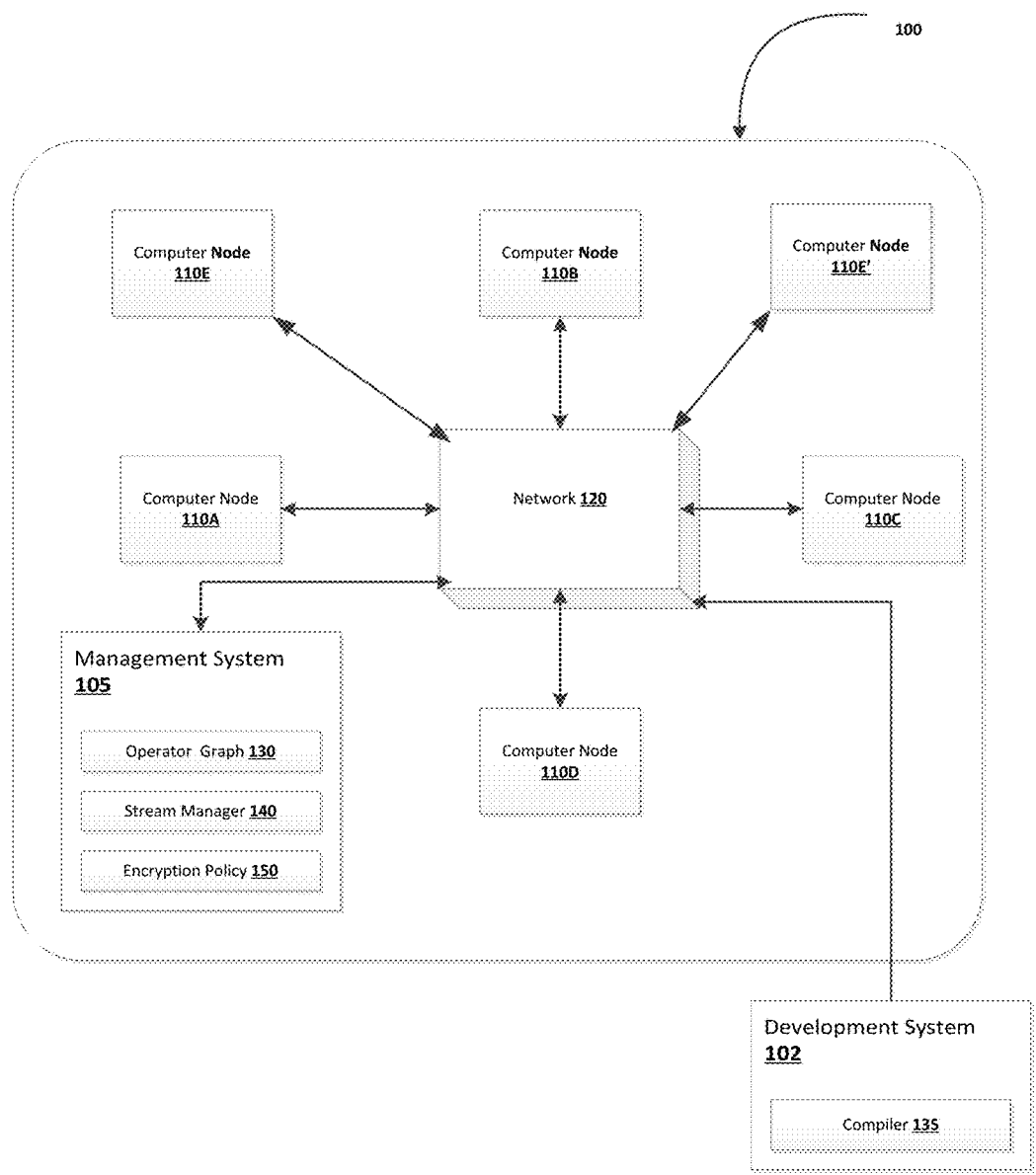
FIG. 1 illustrates a stream computing infrastructure configured to execute a stream computing application, according to various embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

IV. DETAILED DESCRIPTION

Aspects of the present disclosure relate generally to stream computing. In embodiments, more particular aspects relate to configuring an encryption policy in a stream computing environment. In embodiments, more particular aspects relate to configuring encryption while maximizing efficiency in the computing environment, which can include minimizing latency and/or conserving computing resources. While the present disclosure is not necessarily limited to such applications, various aspects of the disclosure can be appreciated through a discussion of various examples using this context.

Stream-based computing and stream-based database computing are emerging as a developing technology for a variety of applications. For example, products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it can perform operations, such as analysis logic, which can change the tuple (further defined herein) by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using some inter-process communication techniques. Further, processing elements can be inserted or removed dynamically from an operator graph representing the flow of data through the stream computing application. A particular stream operator may not reside within the same operating system process as other stream operators. Stream operators in the same operator graph can be hosted on different nodes, e.g., on different compute nodes or on different cores of a compute node.

Data flows from one stream operator to another in the form of a "tuple." A tuple is a sequence or row of one or more attribute values associated with an entity. Attributes can be any of a variety of different types, e.g., integer, float, Boolean, string, etc. The attributes can be ordered. In addition to attributes associated with an entity, a tuple can include metadata, i.e., data about the triple. A tuple can be extended by adding one or more additional attributes or metadata to it. As used herein, "stream" or "data stream" refers to a sequence of tuples. Generally, a stream can be considered a pseudo-infinite sequence of tuples.

Tuples are received and output by stream operators and processing elements. An input triple corresponding with a particular entity that is received by a stream operator or processing element, however, is generally not considered to be the same tuple that is output by the stream operator or processing element, even if the output tuple corresponds with the same entity or data as the input tuple. An output tuple may not necessarily be changed from the input tuple.

Nonetheless, an output tuple can be changed in some way by a stream operator or processing element. An attribute or metadata can be added, deleted, or modified. For example, a tuple will often have two or more attributes. A stream operator or processing element can receive the tuple having multiple attributes and output a tuple corresponding with the input tuple. The stream operator or processing element can only change one of the attributes so that all of the attributes of the output tuple except one are the same as the attributes of the input tuple.

Generally, a particular tuple output by a stream operator or processing element may not be considered to be the same triple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that is to be processed efficiently and in real time. For example, a stream computing application can continuously ingest and analyze hundreds of thousands of messages per second and up to petabytes of data per day. Accordingly, each stream operator in a stream computing application can process a received tuple within fractions of a second. Unless the stream operators are located in. the same processing element, an inter-process communication path can be used each time a tuple is sent from one stream operator to another. Inter-process communication paths can be a resource in a stream computing application. According to various embodiments, the available bandwidth on one or more inter-process communication paths can be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph can be a linear arrangement of processing elements and/or operators, or it can include one or more distinct execution paths, also known as sub-processes, methods, or branches.

According to various embodiments, an operator can be deployed on a network, stream operators can be configured to simulate processing, one or more simulation conditions can be specified, and a particular workload can be input to the operator graph. While simulated processing of a stream of test tuples is performed, one or more inter-stream operator communication paths (either on the network, within compute nodes, or both) can be monitored to determine one or more performance metrics. Simulated processing can include simulating different workloads, as well as shutting down or turning on parts of the operator graph. In addition, simulated processing can also include simulating activities initiated by a stream operator that can affect the network.

One example of a performance metric is the latency between compute nodes. Where the latency of a link on a link is such that the capacity of the entire streaming application is limited, a bottleneck can be identified. Other examples of a performance metric are the time required by a compute node for processing a tuple and the latency of an inter-stream operator communication path within a compute node, which can cause congestion and thus form a point of congestion. An additional example of a performance metric is an identification of a topographic feature of an operator graph that affects the performance of a stream-based computing application. Furthermore, while embodiments include identifying bottlenecks and other types of latency or congestion, in other embodiments, known throughput dependencies can be identified, or performance metrics can be used to identify locations in the operator graph with excess bandwidth, excess processing capacity, that are uncongested or that have relatively low latency.

According to various embodiments, the performance of the stream-based computing application during the simulated processing can be monitored to determine one or more performance metrics with respect to how an inter-stream operator communication path, compute node, or other resource affects application performance. In addition the simulated processing can be monitored to determine a performance metric that identifies locations in the operator graph with excess bandwidth, excess processing capacity, that are uncongested, or that have relatively low latency.

Parameters that can be varied in multiple simulations can also relate to the operator graph rather than the workload. One example of a parameter of this type that can be varied in multiple simulations is the operator graph configuration, parts of the operator graph can be turned off or turned on. For example, a stream operator, a processing element, a compute node, or a branch of an operator graph can be turned on in a baseline simulation and turned off in a subsequent simulation. An additional example of a parameter that can be varied in multiple simulations is configuring a stream operator or processing element to perform or not perform operations that can affect the network. For example, a processing element can be configured to open a TCP/IP socket and initiate a non-tuple communication. Further examples of parameters that can be varied in multiple simulations are stream operator behaviors that affect the performance of a stream-based computing application. This type of behavior can include tuple sorting and routing criteria used by a stream operator as well as the number of tuples that are output by a stream operator in response to receiving an input tuple. In addition, this type of behavior can include the size (e.g., number of bytes) of tuples output by a stream operator.

Various embodiments are directed to perform one or more simulated processes. For example, a first simulated processing of the stream-based computing application using a first simulation condition is performed, and a second simulated processing of the stream-based computing application using a second simulation condition is performed, where the second process can be distinct from the first, while also being conditioned on the results of the first simulation. The first simulation condition specifies a first operator graph configuration. The second simulation condition specifies a second operator graph configuration and the second simulation condition can be distinct from the first simulation condition. Each simulated processing is monitored to determine one or more performance metrics. In addition, the first and second simulated processing can be sorted based on a first performance metric to identify a simulated processing having a first rank. An operator graph configuration associated with the simulated processing having the first rank can be selected if the first performance metric for the simulated processing having the first rank is within a processing constraint. In certain embodiments, a bottleneck can be hinted at manually by the developer, estimated by computations, or computed dynamically. Various other techniques for simulated processing, routing predictions, and bottleneck identification and these are merely exemplary.

In a stream computing environment, it may be desirable to provide security for streaming data that is transmitted between two or more stream operators, regardless of whether the two or more stream operators are located on the same compute node, different compute nodes, and/or on different server computing devices. In some configurations, embodiments can be configured to provide security for specific tuples, specific attributes of tuples, or a specific value of a particular tuple, as opposed to an entire stream of tuples. For example, a stream computing application that tracks real-time sales information could be configured to implement an encryption policy that includes a rule to encrypt information specifying the name of a product that was involved in a sales transaction (e.g., because the owner of the application may not wish to share which product is making sales for competitive reasons). However, the same encryption policy can specify to not encrypt the information specifying sales amount in dollars, information specifying the time of the sale, information specifying the date of the sale, etc., because this information may not be considered as proprietary. In certain embodiments, identifying the bottleneck or point of congestion in a streaming system can form the basis for developing an encryption by, for example, prioritizing encryption based on the slowest points in the system or disabling encryption where communication is limited to secure networks, such a local area network ("LAN"). Therefore, embodiments of the present disclosure are directed to establishing an encryption policy to encrypt at least a portion of tuples and process the tuples based on the encryption policy.

Encryption is the process of converting ordinary text (i.e., plaintext), into a form that is unreadable (i.e., ciphertext). Decryption reverses the encryption process by translating ciphertext into plaintext. A cipher is an algorithm used to perform a particular type of encryption and decryption. A security key (e.g., public or private key) can be a set of particular parameters that guide the algorithm and encrypt or decrypts data. The encrypted connection can be any encrypted connection type according to various encryption engine algorithms and keying systems (e.g., Secure Sockets Layer (SSL), Transport Layer Security (TLS), Secure Hypertext Transfer Protocol, etc.).

FIG. 1 illustrates one exemplary stream computing infrastructure 100 that can be configured to execute a stream computing application, according to some embodiments. The stream computing infrastructure 100 includes a management system 105 and two or more compute nodes 110A-110E—i.e.,—hosts which are communicatively coupled to each other using one or more communications networks 120. The management system 105 can include an operator graph 130, a stream manager 140, and an encryption policy 150, discussed further in FIG. 3. The communications network 120 can include one or more servers, networks, or databases, and can use a particular communication protocol to transfer data between the compute nodes 110A-110E'. The stream manager 140 can include a congestion management component 345 for identifying, deploying or re-deploying stream operators associated with a point of congestion or bottleneck to a secure environment in the system. Furthermore, in certain embodiments, the stream manger 140 can communicate with the encryption policy 150 to determine certain encryption parameters and conditions. A development system 102 can be communicatively coupled with the management system 105 and the compute nodes 110 either directly or indirectly via the communications network 120. In some embodiments, the stream computing infrastructure 100 is an entirely server side environment for processing and analyzing tuples (e.g., a data stream management system). Therefore, for example, client devices (e.g., mobile phones) in some embodiments may not affect or perform any of the processes as described herein. Accordingly, two or more operators that are processing tuples can be included within the same server system and not within any client devices.

The communications network 120 can include a variety of types of physical communication channels or "links." The links can be wired, wireless, optical, or any other suitable media. In addition, the communications network 120 can include a variety of network hardware and software for performing routing, switching, and other functions, such as routers, switches, or bridges. The communications network 120 can be dedicated for use by a stream computing application or shared with other applications and users. The communications network 120 can be any size. For example, the communications network 120 can include a single local area network or a wide area network spanning a large geographical area, such as the Internet or any combination thereof. The computer nodes 110A-110E' can communicate with all or portions of the network, for instance computer node 110E can be configured to only communicate with a secure portion of the network, such as LAN connection. The links can provide different levels of bandwidth or capacity to transfer data at a particular rate. The bandwidth that a particular link provides can vary depending on a variety of factors, including the type of communication media and whether particular network hardware or software is functioning correctly or at full capacity. In addition, the bandwidth that a particular link provides to a stream computing application can vary if the link is shared with other applications and users. The available bandwidth can vary depending on the load placed on the link by the other applications and users. The bandwidth that a particular link provides can also vary depending on a temporal factor, such as time of day, day of week, day of month, or season.

Figure 2:
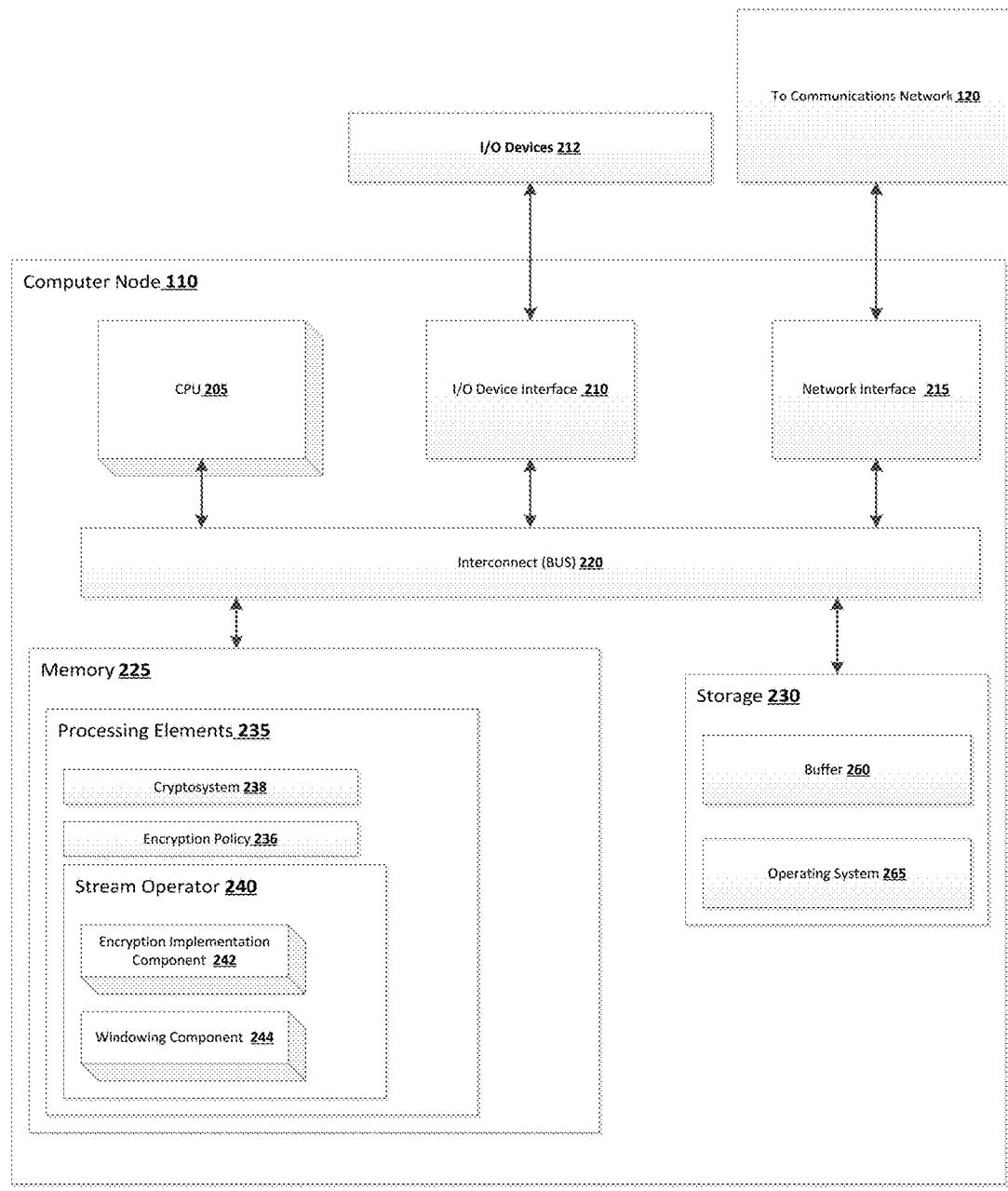
FIG. 2 illustrates a more detailed view of a compute node of FIG. 1, according to various embodiments.

FIG. 2 is a more detailed view of a compute node 110, which can be the same as one of the compute nodes 110A-110E' of FIG. 1, according to various embodiments. The compute node 110 can include, without limitation, one or more processors (CPUs) 205, a network interface 215, an interconnect 220, a memory 225, and a storage 230. The compute node 110 can also include an I/O device interface 210 used to connect I/O devices 212, e.g., keyboard, display, and mouse devices, to the compute node 110. In some embodiments, each of the compute nodes 110 represents a particular compute instance of a single computing device (e.g., computing components within a chassis, a blade within a blade server, an I/O drawer, a processor chip, etc.). For example, compute node 110A can correspond to a first chassis within a first computing device and compute node 110B can correspond to a second chassis within the first computing device. Alternatively, each of the compute nodes 110 can represent an entire computing device that includes one or more processors and one or more associated memory devices. For example, compute node 110A can be a first server computing device host and compute node 110B can be a second server computing device host.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 can be one or more busses. The CPUs 205 can be a single CPU, multiple CPUs, or a single CPU having multiple processing cores in various embodiments. In one embodiment, a processor 205 can be a digital signal processor (DSP). One or more processing elements 235 (described below) can be stored in the memory 225. A processing element 235 can include one or more stream operators 240 (described below). In one embodiment, a processing element 235 is assigned to be executed by only one CPU 205, although in other embodiments the stream operators 240 of a processing element 235 can include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that can store non-volatile data. The network interface 215 is configured to transmit data via the communications network 120.

A stream computing application can include one or more stream operators 240 that can be compiled into a "processing element" container 235. Two or more processing elements 235 can run on the same memory 225, each processing element having one or more stream operators 240. Each stream operator 240 can include a portion of code that processes tuples flowing into a processing element and outputs tuples to other stream operators 240 in the same processing element, in other processing elements, or in both the same and other processing elements in a stream computing application. In an embodiment, each stream operator can include a data. encryption component 242 for communicating with the cryptosystem 340 to implement encryption per the encryption policy (discussed below) and a windowing component 244 for grouping at least one tuple of a tuple stream associated with at least one operator for a particular purpose, such as encryption, where, in on embodiment, the windowing component 244 and encryption implementation component can be one and the same. Processing elements 235 can pass tuples to other processing elements that are on the same compute node 110 or on other compute nodes that are accessible via communications network 120. For example, a processing element 235 on compute node 110A can output tuples to a processing element 235 on compute node 110B.

The storage 230 can include a buffer 260. Although shown as being in storage, the buffer 260 can be located in the memory 225 of the compute node 110 or in a combination of both memories. Moreover, storage 230 can include storage space that is external to the compute node 110 such as in a cloud.

The compute node 110 can include one or more operating systems 265. An operating system 265 can be stored partially in memory 225 and partially in storage 230. Alternatively, an operating system can be stored entirely in memory 225 or entirely in storage 230. The operating system provides an interface between various hardware resources, including the CPU 205, and processing elements and other components of the stream computing application. In addition, an operating system provides common services for application programs, such as providing a time function.

The stream computing application can also include an encryption policy 236 and a cryptosystem 238. An encryption policy as described herein is a policy or rule(s) (defined by a user or computing system) that defines what, how and/or when particular tuples or portions (e.g., attributes, values, etc.) of tuples will be encrypted. The encryption policy 236 is described in more detail below. The cryptosystem 238 is a system for providing encryption for the tuples. For example, the cryptosystem 238 can include a keying system for the managing and/or storing of various keys for encrypting and/or decrypting tuples (e.g., public and private keys) and an encryption engine for encrypting tuples according to a particular ciphertext algorithm (e.g., symmetric encryption). The cryptosystem 238 is described in more detail below.

Figure 3:
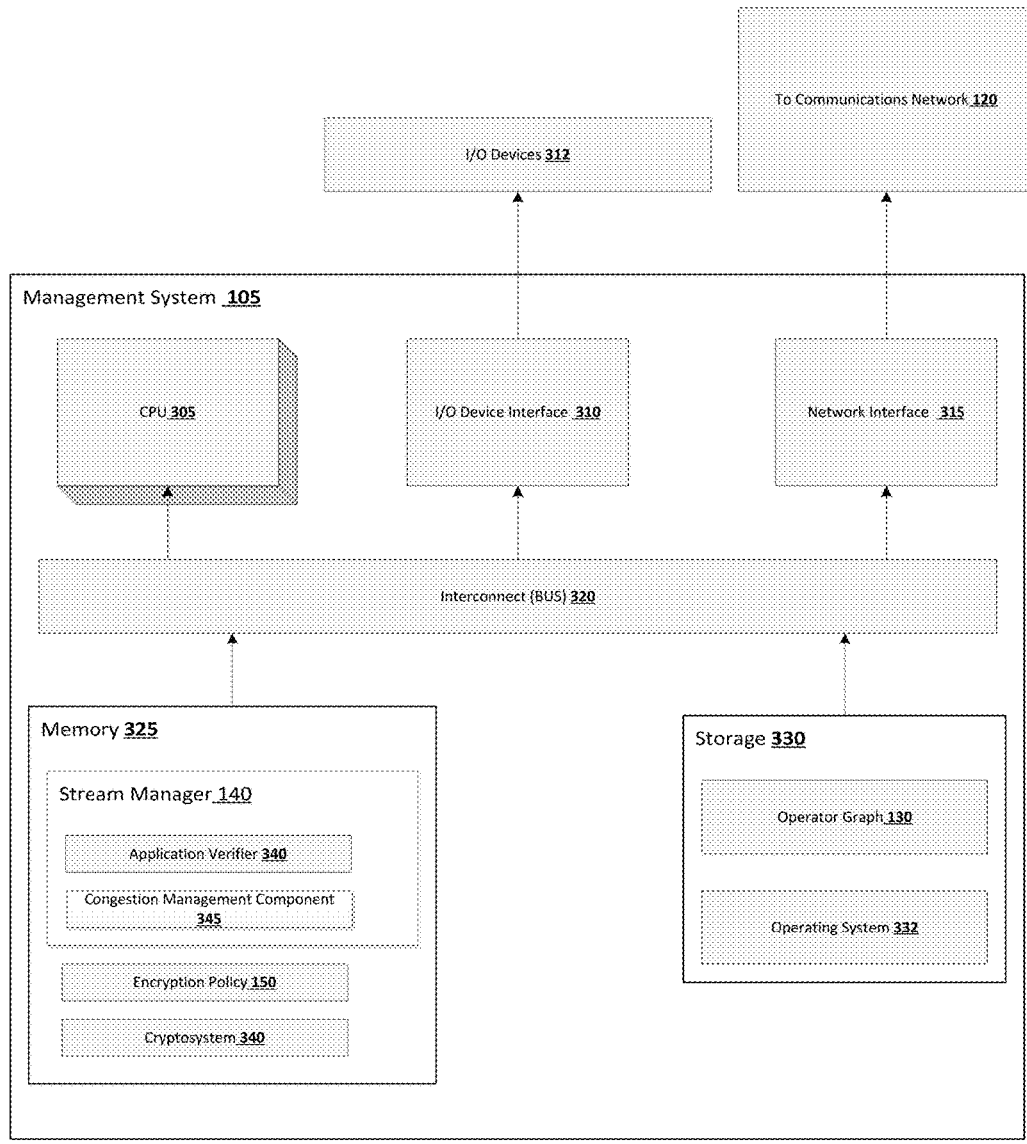
FIG. 3 illustrates a more detailed view of the management system of FIG. 1, according to various embodiments.

FIG. 3 is a more detailed view of the management system 105 of FIG. 1 in accordance with some embodiments of the present disclosure. The management system 105 can be a computing device and include, without limitation, one or more processors (CPUs) 305, a network interface 315, an interconnect 320, a memory 325, and a storage 330. The management system 105 can also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, U0 device interface 310, storage component 330, network interface 315, and memory 325. The interconnect 320 can be one or more busses. The CPUs 305 can be a single CPU, multiple CPUs, or a single CPU having multiple processing cores in various embodiments. In one embodiment, a processor 305 can be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 can store a stream manager 140, the encryption policy 150, application verifier 350 and a cryptosystem 340. Additionally, the storage 330 can store an operator graph 130, and the operating system 332. In some embodiments, the storage 330 can also store the encryption policy 150 and the cryptosystem 340. The operator graph 130 can define how tuples are routed to processing elements 235 (FIG. 2) for processing. In certain embodiments, as illustrated in FIGS. 2 and 3, a cryptosystem can be stored to all of the compute nodes 110A, 110B, 110C, and 110D, 110E and 110E' and the management system 105. This can be for encryption and decryption purposes between two or more compute nodes. For example, a first compute node can store a private key to encrypt a first set (i.e. one or more) of tuples before the first compute node sends the first set of tuples to a second compute node. The second compute node can store the first compute node's public key but also its own private key to decrypt the first set of tuples. Moreover, as illustrated in FIGS. 2 and 3, the same encryption policy 150 can be stored to both the compute node 110 and the management system 105. And the same encryption policy 150 can be stored to multiple compute nodes. This can be for use, for example, in determining what particular portions of a tuple a transmitting or receiving stream operator can encrypt or decrypt respectively. For example, according to an encryption policy, a first stream operator can only encrypt a first attribute of a tuple. In order for the second stream operator to know that only the first attribute should be encrypted (e.g., what to decrypt), the second stream operator can have to be aware of the particular encryption policy.

In certain embodiments, the application verifier 340 or congestion management component 345 can help a user understand whether the infrastructure of a particular network is capable of handling a particular workload within a specified time period. The application verifier 340 or congestion management component 345 can help a user understand how to eliminate network problems, such as congestion and bottle necks, up front before a streaming application is deployed in a production environment. In certain embodiments, the application verifier 340 can also update the encryption policy 236 or make a determination to provide a framework related to encryption.

The congestion management component 345, or other applicable component, can examine the operator graph 130 to determine where one or more bottlenecks can occur and under what conditions a bottleneck can occur. A bottleneck can be a location that limits the capacity of an entire streaming application. A bottleneck can occur on inter-stream operator communication path. A bottleneck can occur on a single link or in a region (two or more links) of the operator graph 130. A bottleneck can occur within a compute node, such as a bottleneck that occurs in connection with use of shared memory. A bottleneck can be in a location where available bandwidth is substantially slower than other similar locations, e.g., other similar links or regions of the operator graph 130. In addition, a bottleneck can be a link, region, or other location where the volume of data being transferred is substantially greater than the volume of data transferred on other similar links, regions, or locations. Further, the congestion management component 345 or application verifier 350 can identify topographic features that affect the performance of a stream-based computing application; and can also help a user understand whether the infrastructure of a particular network is capable of handling a particular workload within a specified time period. The congestion management component 345 or application verifier 350 can help a user understand how to eliminate network problems, such as congestion and bottle necks, up front before a streaming application is deployed in a production environment.

In certain embodiments, as discussed below, a compute node designated as containing unencrypted information that will be confined to a local or secure network may not contain a cryptosystem, or the cryptosystem 340 can be adjusted, per the encryption policy 236, to encrypt partially or not at all tuples for a particular computer node, or it can, per the encryption policy 236 provide encryption to triples of an operators, incoming or outgoing, designated solely for encrypted data within a compute node.

The management system 105 can include one or more operating systems 332. An operating system 332 can be stored partially in memory 325 and partially in storage 330. Alternatively, an operating system can be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4A:
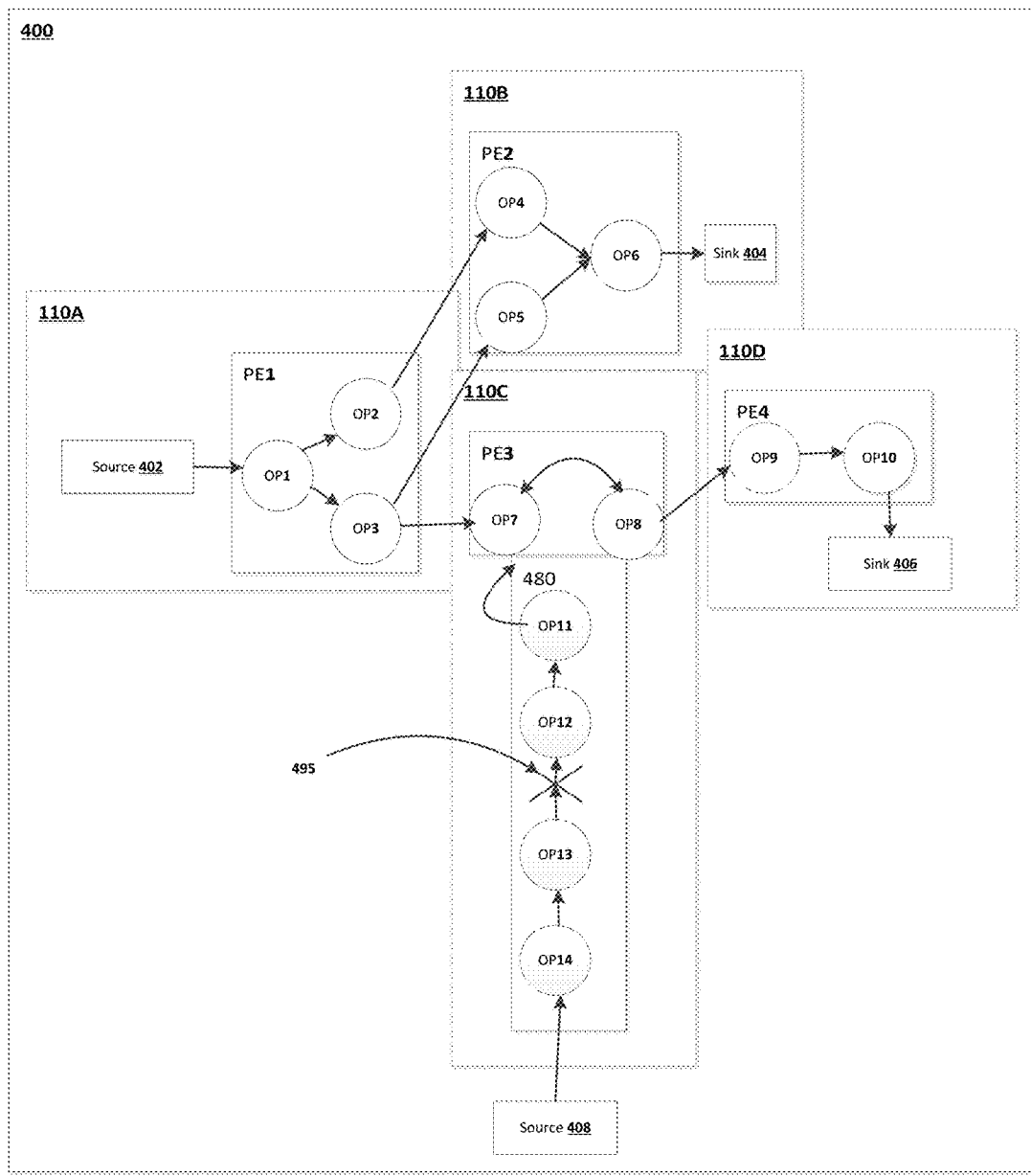
FIG. 4A illustrates an operator graph for a stream computing application, according to various embodiments.

FIG. 4A illustrates an exemplary operator graph 401 for a stream computing application beginning from one or more sources, i.e. 402, through to one or more sinks, i.e. 404, 406, according to some embodiments. This flow from source to sink can also be generally referred to herein as an execution path. In addition, a flow from one processing element to another can be referred to as an execution path in various contexts. FIG. 4A is abstracted to show connected operators, which can be part of one of processing elements PE1-PE4, where PE1-PE4 contain one or more operators, including operators OP1-OP14. As shown, the operator graph 401 can include data flows between stream operators 240 (FIG. 2) within the same or different processing elements, i.e., PE1-PE4. Typically, processing elements, and operators associated therewith, such as processing element 235 (FIG. 2), receive tuples from the stream as well as output tuples into the stream (except for a component designated solely sink— where the stream terminates, or a component designated solely as a source—where the stream begins). While the operator graph 401 includes a relatively small number of components, an operator graph can be much more complex and can include many individual operator graphs that can be statically or dynamically linked together.

The example operator graph shown in FIG. 4A includes fourteen operators (labeled as OP1-OP14) contained in one or more processing elements PE1-PE4 and running on the compute nodes 110A-110E'. The processing elements, computer node, and operators are part of an exposed network, i.e. a network 400 with an external connection, general access availability, or security vulnerability. The network 400 can be part of the network 120. A processing element can include one or more stream operators fused together to form an independently running process with its own process ID (PID) and memory space. In cases where two (or more) processing elements are running independently, inter-process communication can occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 401 begins at a source 402, 404, 408 and ends at a sink 404, 406. Compute node 110A includes the operators OP1, OP2, and OP3. Source 402 flows into the operator OP1, which in turn outputs triples that are received by OP2 and OP3. For example, OP1 can split data attributes received in a triple and pass some data attributes in a new tuple to OP2, while passing other data attributes in another new tuple to OP3. As a second example, OP1 can pass some received triples to OP2 while passing other tuples to OP3. Triples that flow to OP2 are processed by the stream operators contained in OP2, and the resulting tuples are then output to OP4 on compute node 110B. Likewise, the triples output by OP4 flow to OP6 before being transmitted to a sink 404. Similarly, triples flowing from OP3 to OP5 also reach OP6 and are sent to a sink 404. Thus, OP6 could be configured to perform a join operation, combining triples received from OP4 and OP5, before sending the data to the sink 404. This example operator graph also shows tuples flowing from OP3 to OP7 on compute node 110C, which itself shows triples flowing to OP8 and looping back to OP7. Compute node HOC also contains a set of operators 480 that are associated with a point of congestion 495. Specifically, Source 408 flows into OP14, with tuples outputted to OP13, and in turn to OP12, followed by OP12 outputting, processed tuples to OP11, which then transmits tuples into OP7. Tuples output from OP8 flow to OP9 on compute node 110D, which in turn outputs tuples to be processed by operators in OP10 before being sent to a sink 406. In this embodiment of the operator graph 400, the encryption implementation unit 242 configures the encryption policy 236 without considering the effects of congestion or whether encryption is redundant based on inter-dependence of certain applications.

Figure 4B:
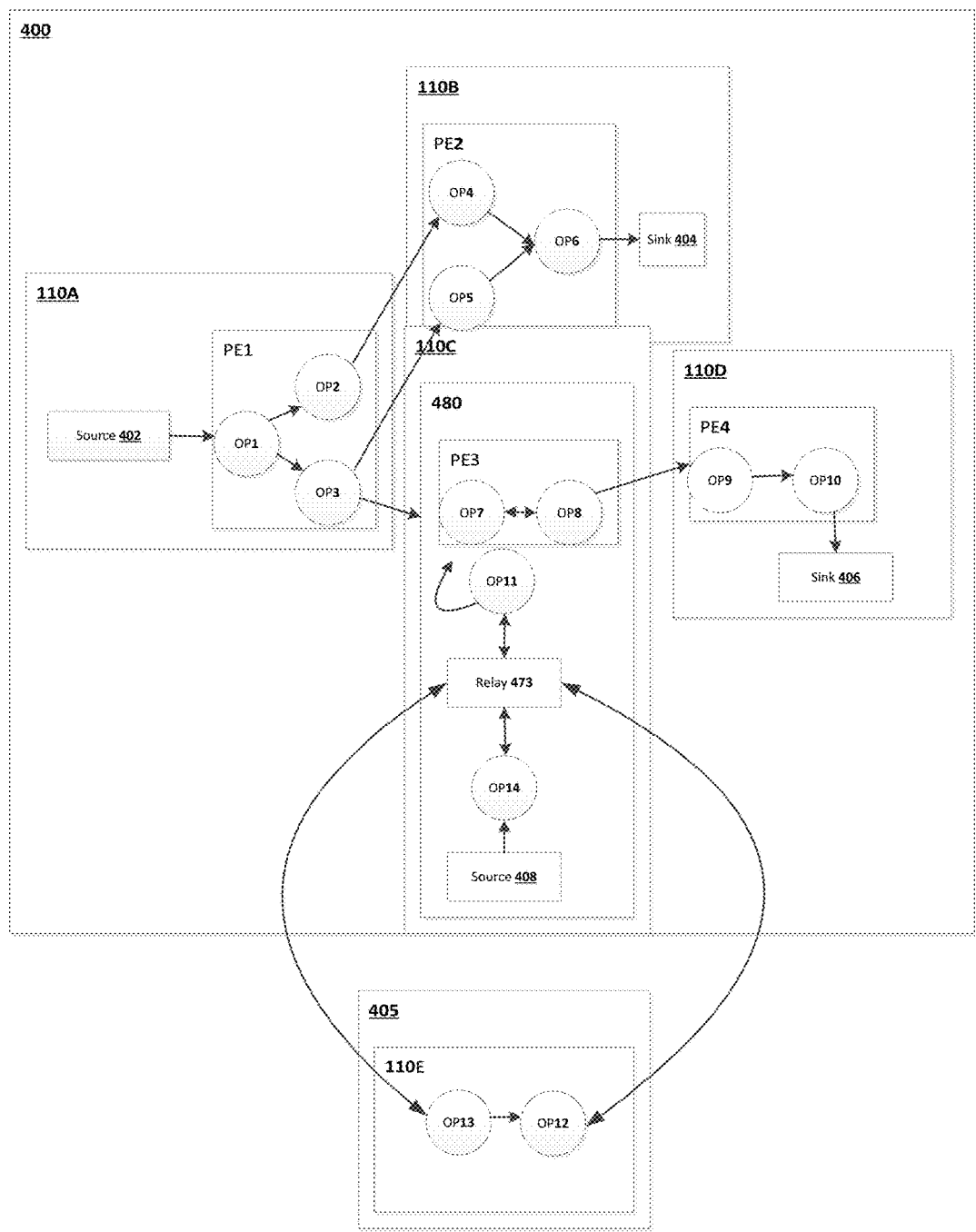
FIG. 4B illustrates an operator graph for stream computing, with an isolated network, according to various embodiments.

FIG. 4B illustrates an embodiment for re-deploying operators and maximizing efficiency associated with potential encryption. The stream manager 140 will re-deploy the operators that are the source of the congestion, i.e. operators OP13 and OP12, to a node 110E located in an isolated network 405. A computer security module (not shown) will employ at least one security feature with respect to the isolated network, including but not limited to i) limiting access to the network to a pre-determined group of individuals or other compute nodes, ii) limiting access solely to LAN components and LAN networks, iii) disabling connections to external networks, such as the internet, iv) if the network 400 is a cloud environment, restricting access to individuals with a specified security clearance, during certain times, and/or identifying if an individual has credentials corresponding to an entity's intranet before permitting that individual access. For example, if Company X employs the system 100 in a manner that communicates with a purely internal network, such as a company intranet, the computer security model can restrict access to network 405 solely to individuals or compute nodes with verified intranet access credentials. In one embodiment, the network 405 will be a LAN network without connection to an external network, and with a security protocol that limits communication to and fro based on a specified security clearance granted to individuals that have access to the overall computer system 100. In one embodiment, the re-deployed operators, OP13 and OP12, can still communicate, as necessary, with OP11 and OP14 using a relay device 473. Network 405 can also be part of the greater network 120, provided it is isolated and/or secured as described herein, i.e. for example, disabled from having internet access.

According to an embodiment, the encryption implementation component 242 will configure the encryption policy 236 to disable all encryption associated with the re-deployed operators, including OP13 and OP14. This can mitigate latency costs and computing costs by ensuring that encryption does not happen redundantly, i.e. if the output of OP11 is to be encrypted, it might be redundant to also encrypt outputted data tuples that OP11 receives from another operator, i.e. OP12. For instance, if OP12 is a speech-to-text operator that feeds OP11, which runs analytics on the text, the speed of the entire application is contingent on OP11 receiving an input of data from OP12. Minimizing the speed at which this occurs, i.e. by disabling encryption with respect to OP12, enhances the speed of the overall application. Furthermore, by re-deploying the operators to an isolated/secure network 405, security is not compromised, i.e., in the speech-to-text example, if the content of the speech and converted text contains sensitive information, lack of encryption will not constitute a substantial threat in light of the isolation and/or security measures of network 405.

Although not shown in FIGS. 4A or 4B, per the encryption policy 236, the cryptosystem 340 can encrypt the data links between operators in network 400; for example, after the re-deployment, the output of OP11 can be encrypted since it will be distributed to other parts of network 400 which may have security vulnerabilities, such as external or unrestricted access. In the speech to text example, this would mean that the content of the original speech/text would be protected, as well as any analytics information that was processed by OP11. Furthermore, although in some of the above embodiments the re-deployed operators may have had their output/input data streams encrypted, and after-redeployment, the encryption would be subsequently disabled in the isolated/secure network 405, in other embodiments the encryption policy could be configured by a user, the encryption implementation component 242, or equivalent component to withhold encryption from the bottleneck operators at initial deployment. As discussed below, the present disclosure discusses techniques for identifying bottlenecks by the user or having a system do so dynamically, i.e. running simulations to identify the bottlenecks, and as such, according to some embodiments, the operators can be directly deployed to the isolated network 405 without ever being encrypted, i.e. the system, either by user input or by having a system run simulations, determines where the bottlenecks will be and deploys the bottleneck operators to an isolated network at the onset, i.e. first deployment of the operators or during an initial configuration of the relevant applications.

Figure 4C:
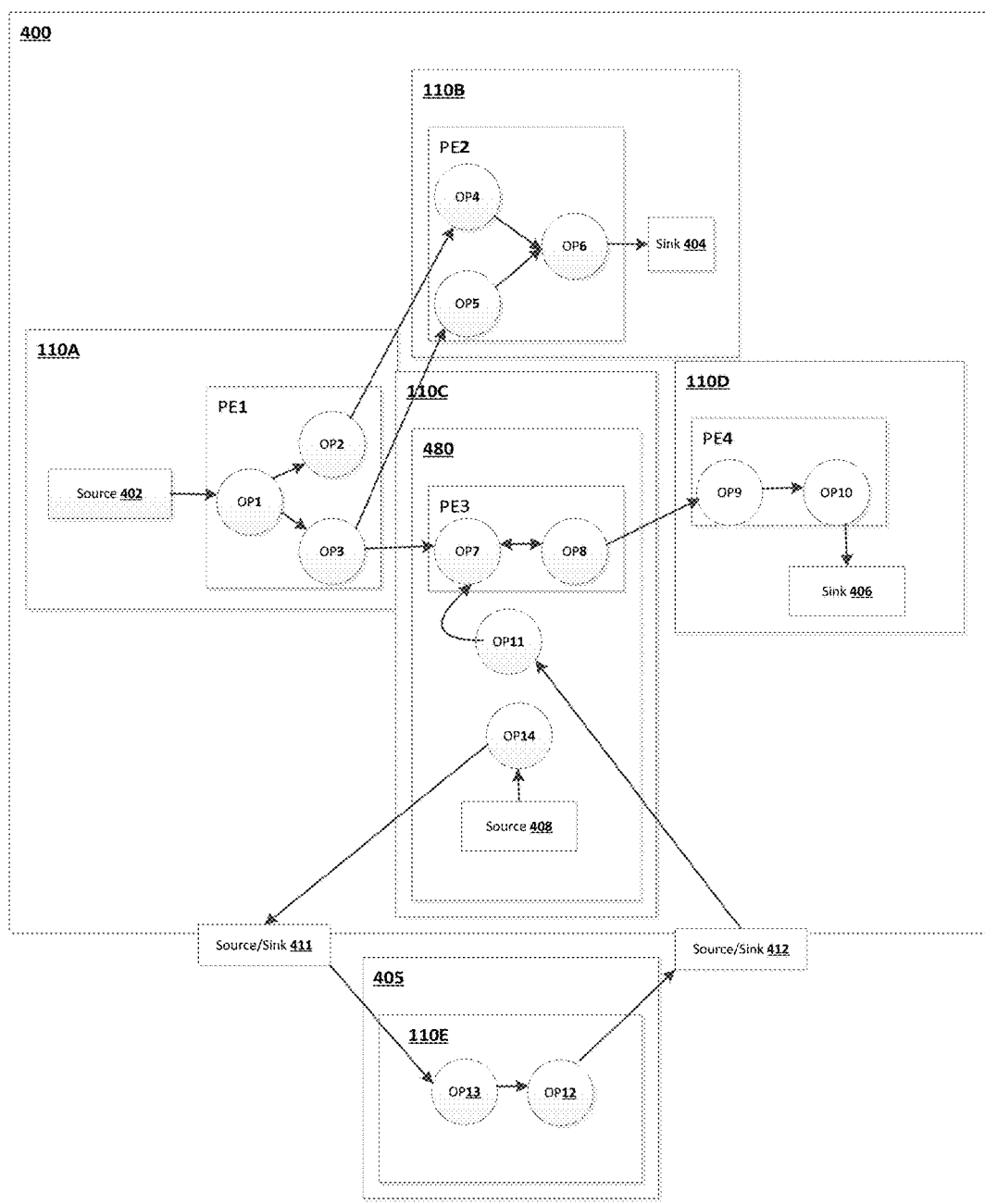
FIG. 4C illustrates an operator graph for stream computing, with an isolated network, according to various embodiments.

FIG. 4C illustrates an embodiment for re-deploying operators and maximizing efficiency associated with potential encryption. As in the embodiment illustrated in FIG. 4B, the stream manager 140 will re-deploy the operators that are associated with the congestion, i.e. operators OP13 and OP12, to a node 110E located in an isolated network 405, A computer security module (not shown) will employ at least one security feature with respect to the isolated network, including but not limited to i) limiting access to the network to a pre-determined group of individuals or other compute nodes, ii) limiting access solely to LAN components and LAN networks, iii) disabling connections to external networks, such as the internet, iv) if the network 400 is a cloud environment, restricting access to individuals with a specified security clearance, during certain times, and/or identifying if an individual has credentials corresponding to an entity's intranet before permitting that individual access. For example, if Company X employs the system 100 in a manner that communicates with a purely internal network, such as a company intranet, the computer security model can restrict access to network 405 solely to individuals or compute nodes with verified intranet access credentials. In one embodiment, the network 405 will be a LAN network without connection to an external network, and with a security protocol that limits communication to and fro based on a specified security clearance granted to individuals that have access to the overall computer system 100. According to the embodiment according to FIG. 4C, OP13 has an input from source/sink 411, which receives an input from OP14, and OP12 outputs to source/sink 412, which in turn inputs into OP11. This enables the proper operation of the operator graph 401 by ensuring that, despite the re-deployment of operators, proper data exchange remains intact.

According to an embodiment, as above, the encryption implementation unit 242 will configure the encryption policy 236 to disable all encryption associated with the re-deployed operators, including OP13 and OP12. This can mitigate latency costs and computing costs by ensuring that encryption does not happen redundantly, i.e. if the output of OP11 is to be encrypted, it might be redundant to also encrypt outputted data tuples that OP11 receives from another operator, i.e. OP12. For instance, if OP12 is a speech-to-text operator that feeds OP11, which runs analytics on the text, the speed of the entire application is contingent on OP11 receiving an input of data from OP12. Minimizing the speed at which this occurs, i.e. by disabling encryption with respect to OP12, enhances the speed of the overall application. Furthermore, by re-deploying the operators to an isolated/secure network 405, security is not compromised, i.e., in the speech-to-text example, if the content of the speech and converted text contains sensitive information, lack of encryption will not constitute a substantial threat in light of the isolation and/or security measures of network 405.

Figure 4D:
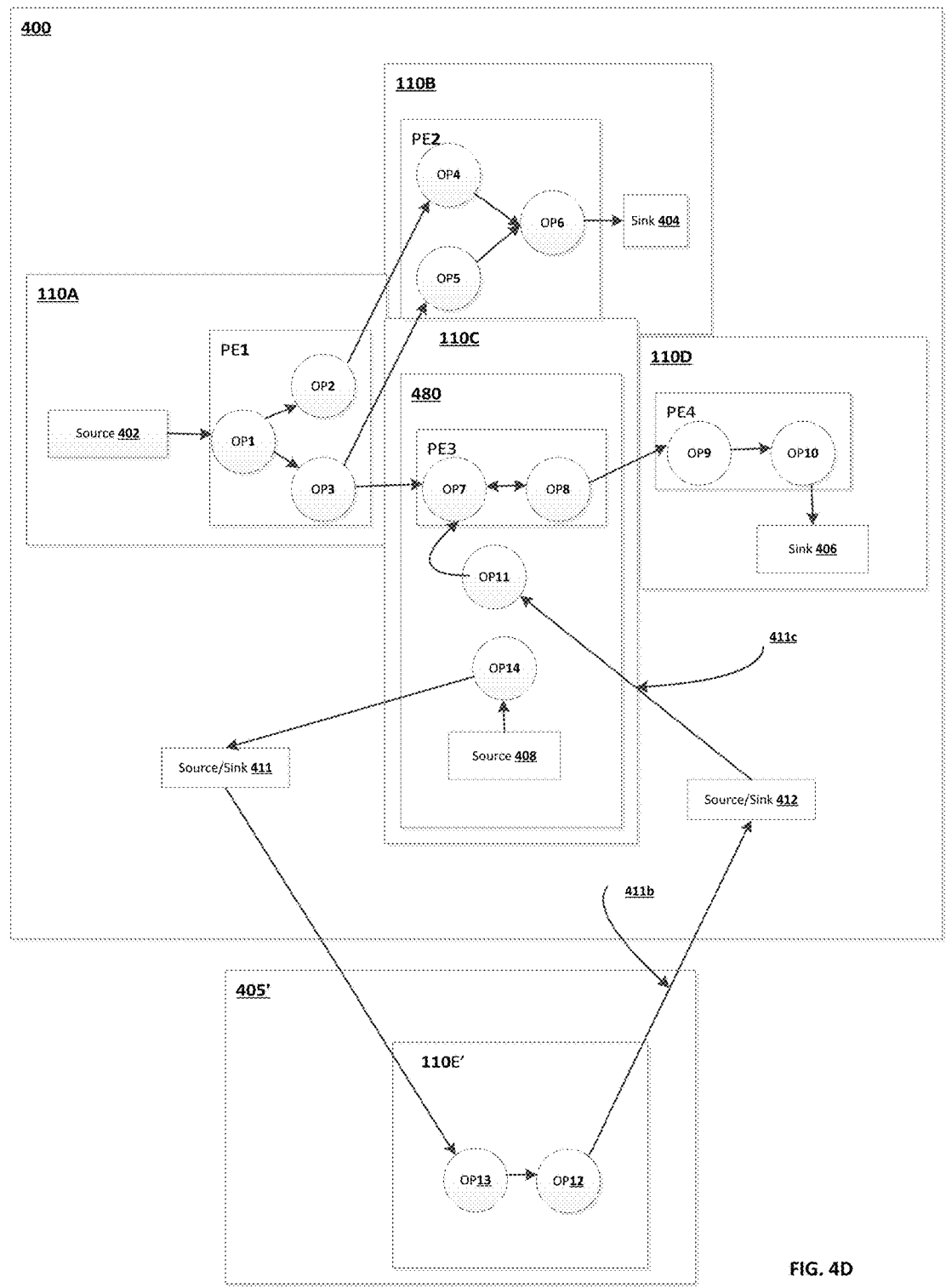
FIG. 4D illustrates an operator graph for stream computing, with an isolated network and encryption associated therewith, according to various embodiments.

FIG. 4D illustrates an embodiment of providing partial encryption to the embodiment of FIG. 4C. In addition to any other concerns that may exist, since the operators, i.e. OP13 and OP12, will receive an input and provide an output, respectively, to data sources/sinks outside of the isolated network, security vulnerability is present. As shown, the encryption implementation component 246 modifies the encryption policy 242 such that the cryptosystem 340 encrypts at least one data link between OP12 and data source/sink 412, and between source/sink 412 and OP11 within the isolated network 405'. Since all the inter-operator communications are within the isolated and/or secure network 405', this embodiment minimizes latency by having encryption take place only at the output of OP12, and security remains intact because of the partial encryption and the nature of network 405'. Although not shown, in another embodiment, the encryption implementation component 246 modifies the encryption policy 242 such that the cryptosystem 340 encrypts at least one data link between OP13 and OP12, between OP12 and data source/sink 412, and between source/sink 412 and OP11 within the isolated network 405'. The encryption can be for all or some of the incoming and/or outgoing tuples streams of the operators and data/sinks associated with the encryption, and as such, in some embodiments, the encryption will be only for partial tuple streams entering or being outputted from those operators. Furthermore, although also not shown, in order to balance latency costs and security concerns, variations of the above encryption is possible, provided that in the embodiment of FIG. 4D at least some encryption takes place. For instance, to reduce latency, since OP13 is in the isolated network 110E', one embodiment may not have encryption between OP12 and OP13, i.e. 411a. In another embodiment, the data link between source/sink 411 and OP13 can be encrypted.

As was the case with FIG. 4A and 4B, and although not shown in FIG. 4C or 4D, per the encryption policy 236, the cryptosystem 238 can encrypt the data links between operators in network 400; for example, after the re-deployment, the output of OP11 can be encrypted since it will be distributed to other parts of network 400 which may have security vulnerabilities, such as external or unrestricted access. In the speech to text example, this would mean that the content of the original speech/text would be protected, as well as any analytics information that was processed by OP11. Furthermore, although in some of the above embodiments the re-deployed operators may have had their data streams encrypted, and after-redeployment, the encryption would be subsequently disabled in the isolated/secure network 405', in other embodiments the encryption policy could be configured by a user, the encryption implementation component 242, or equivalent component to establish partial encryption from the bottleneck operators at initial deployment. As discussed above and below, the present disclosure discusses techniques for identifying bottlenecks by the user or having a system do so dynamically, i.e. running simulations to identify the bottlenecks, and as such, according to some embodiments, the operators can be directly deployed to the isolated network 405" without pursuant to the partial encryption scheme, i.e. the system, either by user input or by having a system run simulations, determines where the bottlenecks will be and deploys the bottleneck operators to an isolated network at the onset, i.e. first deployment of the operators or during an initial configuration of the relevant applications.

Processing elements 235 (FIG. 2) can be configured to receive or output tuples in various formats, e.g., the processing elements or stream operators could exchange data marked up as XML documents. Furthermore, each stream operator 240 within a processing element 235 can be configured to carry out any form of data processing functions on received tuples, including, for example, writing to database tables or performing other database operations such as data joins, splits, reads, etc., as well as performing other data analytic functions or operations.

In some embodiments, the system 100 may not include all of the compute nodes 110A-110E', for instance, as discussed, in embodiments where the encryption policy 236 will designate a single node to contain all processing elements and stream operators unassociated with encryption, such as stream operators and processing elements associated with a point of congestion or bottleneck, and no encryption is implemented in that node, 110E' can be omitted. In some embodiments, where the encryption policy 236 will designate a single node to contain all processing elements and stream operators unassociated with encryption, such as stream operators and processing elements associated with a point of congestion or bottleneck and some encryption is implemented in that node, 110E can be omitted. In other embodiments, both can be included, i.e. the nodes will split the stream operators and processing elements unassociated with encryption, but one of the two will contain stream operators and processing elements that still implement encryption to outputted tuples of those stream operators and processing elements due to some security vulnerability.

The stream manager 140 of FIG. 1 can be configured to monitor a stream computing application running on compute nodes, e.g., compute nodes 110A-110E', change the deployment of an operator graph, e.g., operator graph 130. The stream manager 140 can move processing elements from one compute node 110 to another, for example, to manage the processing loads of the compute nodes 110A-110E' in the stream computing infrastructure 100, or to confine nodes that will interact locally via a LAN, i.e. node 110E, or other secure connection to a particular computer node which will not receive extensive encryption or no encryption at all. Further, stream manager 140 can control the stream computing application by inserting, removing, fusing, un-fusing, or otherwise modifying the processing elements and stream operators (or what tuples flow to the processing elements) on the compute nodes 110A-110E'.

Because a processing element can be a collection of fused stream operators, it is equally correct to describe the operator graph as one or more execution paths between specific stream operators, which can include execution paths to different stream operators within the same processing element. FIG. 4 illustrates execution paths between processing elements for the sake of clarity. As discussed in more detail below, the operator graph 401 in FIG. 4 can represent the flow of tuples between stream operators according to an encryption policy 236.

Figure 5:
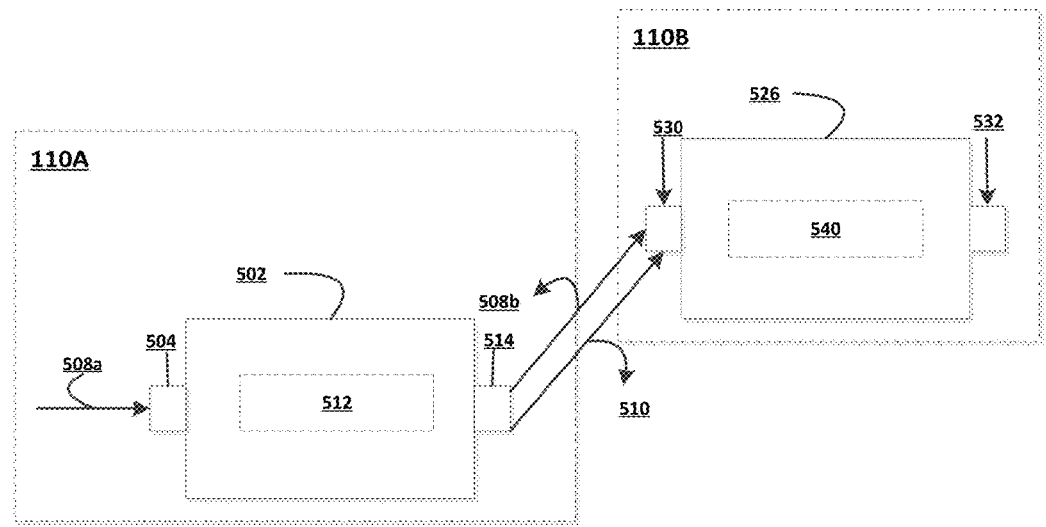
FIG. 5 illustrates a more detailed view of the communication between processing of certain elements on compute nodes of FIG. 4A-4D, according to various embodiments.

FIG. 5 illustrates an embodiment for establishing encryption between stream operators in processing elements according to the present disclosure. According to FIG. 5, a detailed view of the communication between operators in processing elements PE1 and PE2 on compute nodes 110A and 110E respectively of FIG. 4A-4D, and according to various embodiments, is provided; however, the techniques described with respect to FIG. 5 can apply to other operators and processing elements as well.

The processing element PE2 includes a stream operator 502 with input port 504 for receiving a first stream (or portion of a stream) of tuples corresponding to a non-encrypted connection 508 a The stream operator 502 can include a first window 512. The stream operator 502 can also include an Output port 514 that outputs a first set of values of the tuples through the non-encrypted connection 508 to processing element PE4, Which includes the stream operator 526. The encryption implementation component 242 can configure the encryption policy 236 such that the cryptosystem 340 establishes an encrypted connection 510 (e.g., SSL connection) between operators 502 and 526 such that a second set of encrypted values of the stream of tuples are transmitted from the output port 514 to the input port 530 of the stream operator 526, which can be located on compute node 110B. The stream operator 526 can also include its own output port 532 and a second window 540. In some embodiments, as illustrated in FIG. 5A, both the non-encrypted connection b and the encrypted connection 510 can be implemented using the same ports (i.e., output port 514 and input port 530). Accordingly, in one embodiment, the non-encrypted connection 508 b and the encrypted connection 510 are not concurrent in that they are not established at a same time. Rather, the communication from the output port 514 and the input port 620 can switch back and forth between the encrypted connection 508 b and the encrypted connection 510 according to the encryption policy 236, as described in more detail below. Alternatively, in some embodiments, the non-encrypted connection 508 b can be established at the direction of the cryptosystem or otherwise via a first set of ports, and the encrypted connection 510 can be established via a second different set of ports such that the non-encrypted connection 508 b and the encrypted connection 510 can be established at a same time or substantially the same time (i.e., in parallel). The above is merely an exemplary illustration of how encryption can take place, as the present disclosure contemplates embodiments where encryption will not take place in either node 110A or 110B as the streaming manager 140 will direct all encryption to designated nodes, i.e. 110E and/or 110E', but these and other techniques can apply those nodes as well.

According to the illustration of FIG. 5, a first stream of tuples can be received at the input port 504 via the non-encrypted connection 508 a. Consequently, in some embodiments, streams of tuples may not be encrypted for communication between processing elements or stream operators within the same compute node (e.g., compute node 110A). In other embodiments, however, streams of tuples can be encrypted for any communication between any two stream operators within the same node. Accordingly, in some embodiments, the connection 508 a can be an encrypted connection that corresponds to a particular stream operator that transmits a stream of tuples to stream operator 502. It can be desirable to encrypt data between two stream operators within the same compute node to protect against the unauthorized access of data within the compute node. For example, a Transmission Control Protocol/Internet Protocol (TCP/IP) connection can be established between a first stream operator and a stream second operator within the same node, which is described in more detail below. Data packets that include the tuples to be transmitted can be transmitted through the TCP/IP stack or layers (e.g., application layer (e.g., Hypertext Transfer Protocol (HTTP)), a transport layer (e.g., TCP), a network layer (e.g., IP), and a network interface level). When Maple data is ready to be transmitted from the first stream operator to the second stream operator, the tuple data can be transmitted over a Network Interface Card (NIC). Accordingly, when the tuple data is transmitted from the first stream operator to the second stream operator, an eavesdropper can try and intercept the transmitted tuples and either change what is transmitted or listen to what is being transmitted. Accordingly, an encrypted connection can be established (e.g., SSL) between the first and second stream operator such that no eavesdropping can occur. As previously stated, the above is merely an exemplary illustration of how encryption can take place, as the present disclosure contemplates embodiments where encryption will not take place in either node 110A or 110B as the streaming manager will direct all encryption to designated nodes, i.e. 110E and/or 110E', but these and other techniques can apply those nodes as well.

In some embodiments, when the stream operator 502 receives the stream of triples, the stream operator 502 can have identified an encryption policy 236 that includes one or more rules for encrypting at least one or more values of the stream of tuples. For example, the stream manager 140 of FIG. 1 or the encryption implementation component 242 can generate an encryption policy 236 (or receive a user request to implement an encryption policy 236) and accordingly communicate each rule associated with the encryption policy 236 to the node 110A. The encryption policy 236 can specify that all of the "Data X" attribute values of each stream of tuples should be encrypted, but none of the "Tuple Size" attribute values of the stream of tuples should be encrypted.

In some embodiments, when the streaming manager 140 determines that operators and associated tuples require re-deployment or encryption implementation unit 242 determines a particular rule for an encryption policy 236, a window 512 can be established. The windowing condition can be established by the windowing component 244 of the relevant stream operator 240 or by the streaming manager 140. A "windowing condition" as described herein, is a logical grouping of tuples by a window based on one or more criteria, such as, but not limited to the encryption policy 236, count, time, and/or delta. Delta refers to the difference in value of a given attribute between the oldest and the newest tuple in the window. In various embodiments, a window can be a tumbling or sliding window. As understood by one of skill in the art, a tumbling window is processed and emptied when the grouping condition is met, whereas in a sliding window the condition where tuples are removed from the window is defined separately from the condition triggering the operation on the tuples in the sliding window. A window can allow for the storage and/or creation of subsets or groups of tuples, and can be used to establish a set of rules that apply to the subsets or groups of tuples.

In an example illustration, a windowing component 244 of the stream operator can create the window 512 that can first group the values of the stream of tuples that will not be encrypted, according to the encryption policy 236, such that the output port 514 can transmit the encrypted values first to the input port 530 via the encrypted connection 510. In order to group the values of the stream of tuples that will not be encrypted, the grouping stream operator can first extract the values from their respective tuples and group the values. For example, using the illustration above, if the encryption policy 236 specified that all "Data X" attribute values were to be encrypted for each tuple, but all "Tuple Size" attribute values were to not be encrypted, then the window 512 can first extract and group each of the "Tuple Size" values first.

The stream operator 502 and stream operator 526 can then establish the encrypted connection 510 (e.g., SSL connection), as described in more detail below. Accordingly, the output port 514 can then extract and transmit each of the "Data X" attribute values of the stream of tuples to the input port 530 via the encrypted connection 510. When a window condition is met, such as all of the encrypted "Data X" values have been transmitted for a given set of tuple or after a particular quantity of time, the window 512 can be released such that the "Tuple Size" values can then be transmitted from the output 514 to the input port 530 via the non-encrypted connection 608. In some embodiments, the stream operators 502 and/or 504 can include more input and/or output ports than illustrated for transmitting and receiving tuples or values in various manners. For example, the stream operator 502 can include the output port 514 for use in transmitting values via the non-encryption connection 508. However, the stream operator 502 can also include a second output port for use in transmitting values via the encrypted connection 510. The stream operator 526 can also include more respective input and output ports. As previously stated, the above is merely an exemplary illustration of how encryption can take place, as the present disclosure contemplates embodiments where encryption will not take place in either node 110A or 110E as the streaming manager will direct all encryption to designated nodes, i.e. 110E and/or 110E, but these and other techniques can apply those nodes as well.

In certain embodiments, as discussed above, all streams of tuples in a particular computer node, i.e. 110E, are deployed on an isolated network, such as a LAN, and, per the encryption policy 236, will not be encrypted. In certain embodiments, as provided above, the congestion management component 345 of the stream manager 140 can designate that any processing element, stream operator or steam operators associated with a bottleneck or point of congestion in any other node in the system, i.e. 110A, 110B, etc. will be included or transferred to a designated node in an isolated network, i.e. 110E. This maximizes efficiency by avoiding the use of computer resources and increased latency associated with encryption for information that will be exchanged internal to the secure or LAN network, yet not transmitted externally, while having the cryptosystem 340, per the encryption policy 236 encrypt information, outside of node 110E, that is more vulnerable because it is transmitted externally from the system.

In other embodiments, the stream manager 140 can designate a node, i.e. 110E', as a node where complete encryption is not implemented because some or most tuples of stream operators in the node are communicated via LAN or another secure mechanism, but others can still implement encryption because a security exposure is present that makes encryption attractive, i.e. a processing element or stream operator communicates with a computer node that communicates external to the system via a WAN or otherwise has an identified security vulnerability. This can include embodiments, where the stream manager 140 i) can designate that all or some of the processing elements or steam operators associated with a bottleneck or point of congestion in any other node in the system, i.e. 110A, 110B, etc. will be included or transferred to 110E' or ii) it splits the bottleneck or congestion stream operators and processing elements between a node where no encryption will take place, i.e. 110E, and a node where at least some encryption will take place, i.e. 110E'. In such instances, a particular stream operator within the isolated network 405' and node 110E', for example OP12, will be designated as an encryption operator for the particular computer node, i.e. 110E', and more generally, the isolated network 405', i.e. tuples requiring encryption and associated with a point of congestion or bottleneck will flow through there and establish an encrypted connection at the output.

In certain embodiments, the congestion management component 345 of the stream manager 140 can redeploy all stream operators associated with a bottleneck or point of congestion into node 110E'. The encryption implementation component 242 will modify the encryption policy 236 to determine the manner in which encryption will take place for the tuples associated with the designated stream operators. In one embodiment, the re-deployed operators may transmit data that is subject to a particular security vulnerability, i.e. the system 100 was successfully hacked, a user knows it is subject to a hack, etc. Furthermore, the re-deployed operators may transmit data that possess particularly sensitive information that warrants additional protection, such as highly confidential information from an organization's senior leadership team, highly confidential customer information, or other confidential information. Whatever the particular concern may be, the encryption implementation component 242 or equivalent component can be configured to identify particular concerns, where encryption is required. In this instance, within the isolated network 405'and within the relevant node, i.e. 110E', the encryption implementation component 242 can be configured to alter the encryption policy 246 such that the cryptosystem 340 provides at least partial encryption, i.e. encrypts the tuples with the particular vulnerability. Moreover, a particular operator within the isolated network 405' and relevant node, i.e. 110E', can be designated by the stream manager 140 as the operator where all encryption will take place within the network. For example, the stream manager can designate OP12 as the point of encryption for the isolated network because of its location in the network, i.e. it is at the point that will supply an output to a source/sink, where that source/sink communicates with the network 400, and as such, it is advantageous to have encryption at that point since that is the point where information exits the isolated network 110E'. The encryption operators 550 can include a first window 512E' that is implemented by the windowing component 244 and can group tuples flowing into 502E and then pursuant to the encryption policy 236, the stream operator that received the tuple can employ the cryptosystem 340, to encrypt the grouped tuples pursuant to the encryption policy 236. The encryption itself can typically take place at an output port 514E' of the stream operator 550.

Figure 6:
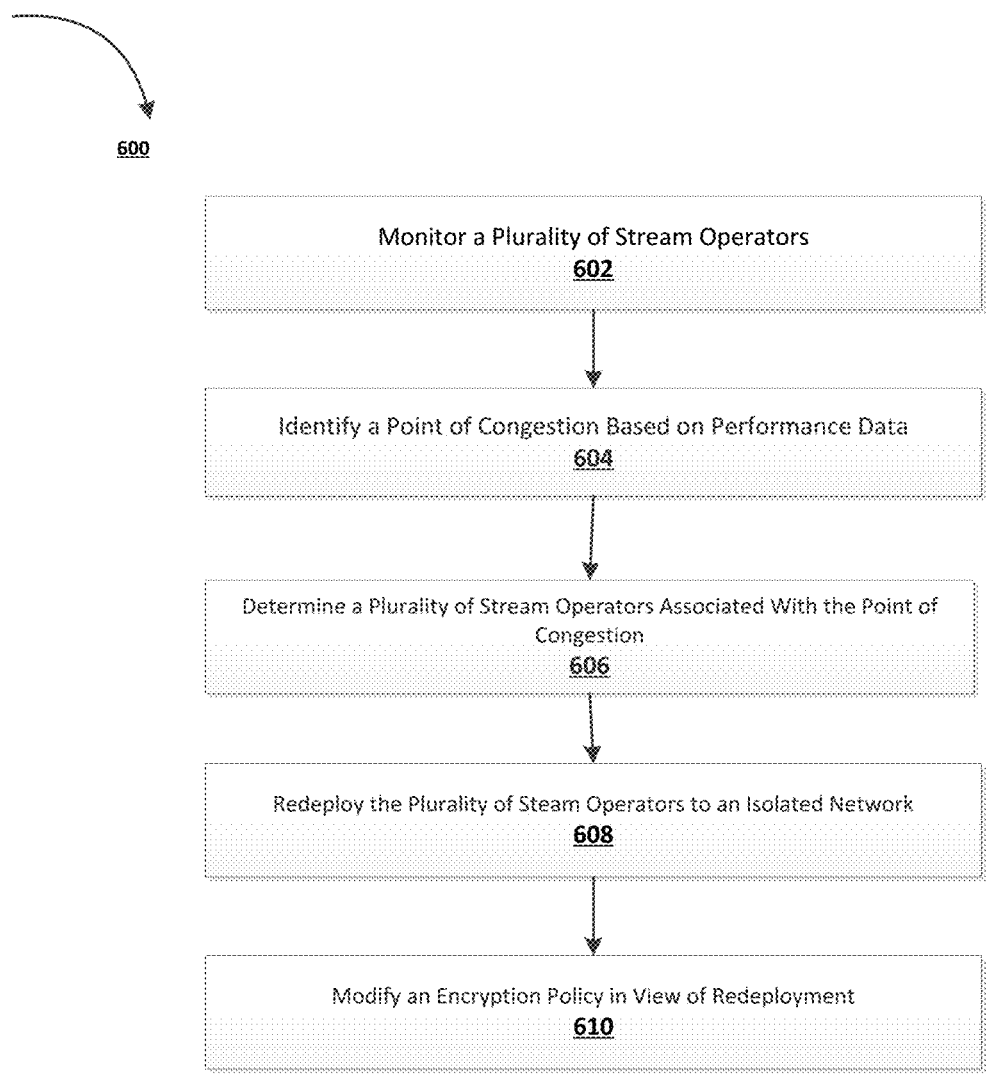
FIG. 6 is a flow diagram of an example process for applying an encryption policy and maximizing efficiency of a streaming system that employs encryption according to one embodiment described herein.

FIG. 6 is a flow diagram of an example process 600 for establishing an encryption policy 236 in light of latency associated with the a system. As shown, the process 600 begins at a block 602, where the stream manager 140 monitors the system to assess performance and latency. At step 604, the congestion management component 345 could, based on the results of the monitoring, identify a bottleneck or point of congestion. The congestion management component could make the identification based on a queue of input tuples having a size that exceeds a threshold number of tuples. Alternatively, the application verifier 340 could determine that a congestion point or latency exists based on the fact that one operator or application depends on another application, and it is a known matter that the operator providing the input constitutes a throughput of an application. For example, if for a given application, one operator conducts the speech-to-text operation and another operator performs analytics on the speech to text output, the application verifier 340 can determine that encrypting the speech to text output in addition to the analytics output would constitute an undue latency because the speed of the latter is contingent on, and is impacted by operations performed on, the former.

As another example, per block 604, the congestion management component 345 can identify the inter-stream operator communication path as a bottleneck based on performance data or other metrics; for example, if the queue of tuples exceeds the threshold for a particular period of time, e.g. 20 ms. In one alternative, the stream manager 140, which includes the congestion management component 345, can identify the inter-stream operator communication path as a bottleneck or point of congestion if the queue of tuples exceeds the threshold a particular number of times during a specified time period, e.g. five times in a 500 ms period. A stream operator or processing element can be configured to shed or discard tuples if it is unable to process received tuples in a timely manner. As such, in one embodiment, the stream manager 140, which includes the congestion management component 345, can identify an inter-stream operator communication path, such as a link, feeding tuples to a stream operator or processing element as a bottleneck if the operator or processing element sheds or discards tuples. The link can be identified as a bottleneck if the number of tuples shed exceeds a threshold or if the operator or processing element sheds tuples for more than a time period exceeding a threshold.

Per Block 606, the stream manager 140 can identify, per the discussion above or otherwise, the stream operator or stream operators associated with the identified point of congestion or bottleneck. For example, irrespective of what method is used to assess whether or not a particular inter-stream operator communication path is a congestion point or bottleneck, the streaming manager 140 can determine what operators are connected or associated with that inter-stream operator communication path, and determine that those stream operators are associated with the bottleneck. In certain embodiments, the stream manager 140 can determine, based on the nature of the connection, that only one stream operator of the communication link is a bottleneck or congestion operators. In other words, if one operator serves as the input of another operator, the inputting operator of the inter-stream operator communication path will be re-deployed per block 606 (see below), as opposed to the operators that it provides the input to. For example, if an inter-stream communication link between a speech to text operator and an analytics operator is determined to be a congestion point or bottleneck, the stream manager can identify the former as a bottleneck since it serves as an input to the analytics operators, whereas the analytics operators will not be subsequently deployed.

Pursuant to block 608, and as alluded to above, the streaming manager 140 can redeploy the bottlenecks identified as part of the bottleneck or congestion point to a secure environment where encryption may or may not take place, while updating the operator graph 130 accordingly in light of the redeployment. For example, the streaming manager 140 can direct all bottleneck stream operators to a specific compute node, i.e. 110E or 110E', in an isolated network 405 and ensure that all communications from computer node. Furthermore, in one embodiment, the streaming manager 140 can ensure that interactions with the communication network 120 are limited to portions of the network that are a LAN or other local type network. According to one embodiment, the encryption policy 236 will exclude encrypting all or some of the operators in the computer node 110E, thus enhancing the speed and efficiency of the system while mitigating the effects of throttling caused by bottleneck operators. Since the designated operators in node 110E, or any other applicably designated computer node, will not communicate with an external network, the chances of data compromise are dramatically reduced, while minimizing latency and without compromising the functionality of the system.

Per block 610, and as outlined by the techniques of the present application, the encryption implementation unit 242 will modify the encryption policy 236 with respect to the redeployed operators. One embodiment for modifying the encryption policy 236 is provided in aspects of FIG. 7A and another embodiment is provided for in aspects of FIG. 7B.

Figure 7A:
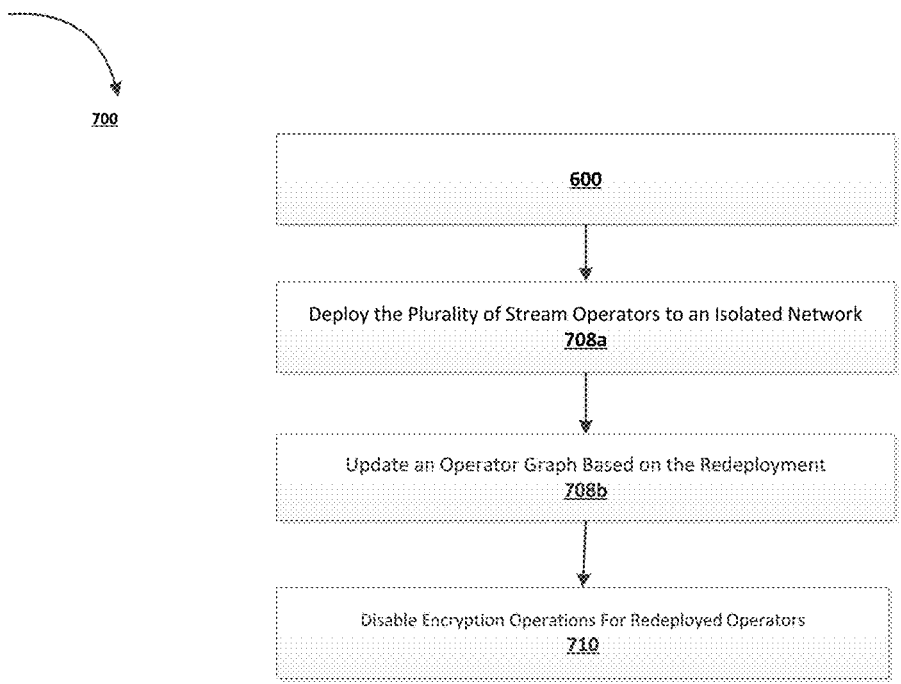
FIG. 7A is a flow diagram of an example process for applying an encryption policy and maximizing efficiency of a streaming system that employs encryption according to one embodiment described herein.
Figure 7B:
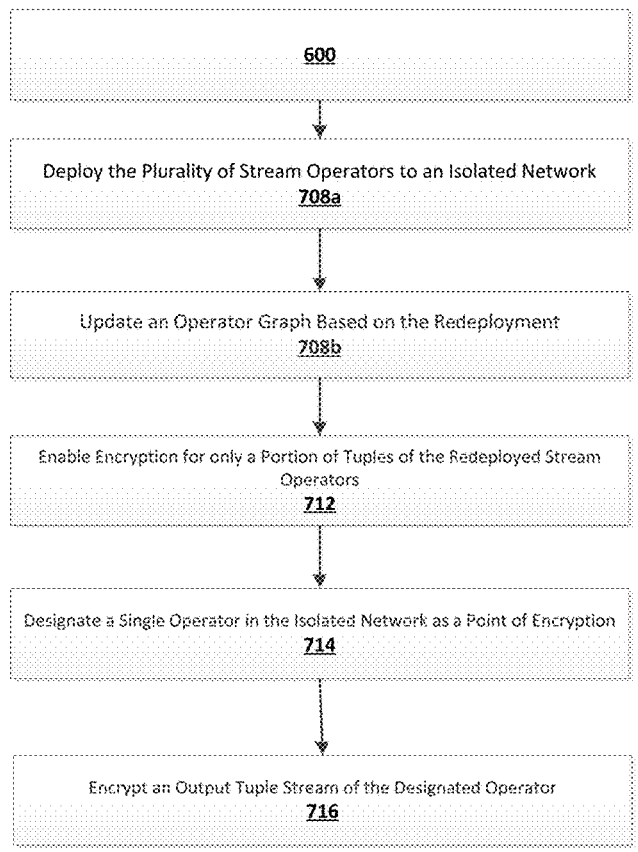
FIG. 7B is a flow diagram of an example process for applying an encryption policy and maximizing efficiency of a streaming system that employs encryption according to one embodiment described herein.

FIG. 7A indicates one embodiment for establishing the redeployment of operators and modifying an encryption policy based on that re-deployment, where encryption is disabled in an isolated network. Per block 708a, the streaming manager 140 will redeploy bottleneck or congestion operators to an isolated network. In one embodiment the isolated network will be a LAN network without connection to an external network, and with a security protocol that limits communication to and fro based on a specified security clearance provided by the user or a security protocol in the system. The stream manger 140, per block 708b, will update an operator graph 130 so that the exchange information amongst operators is in the same manner as prior to re-deployment. In one embodiment, the stream manager 140 can accomplish the proper configuration for communicating by using a relay device as shown by way of non-limiting example in FIG. 4B. In another embodiment, the stream manager 140 can establish the proper configuration for communicating correctly via source/sinks as shown in FIG. 4C. Per block 710, the encryption implementation component 242 or the stream manager itself 140 will reconfigure the encryption policy 236 to disable all encryption activity between inter-operator communication links in the computer nodes, i.e. 110E, within the isolated network, which reduce latency and conserve computing resources, while maintaining an adequate security profile since the network 405 where the re-deployed is isolated from the rest of the network and/or has the security measures discussed above.

FIG. 7AB indicates one embodiment for establishing the redeployment of operators and modifying an encryption policy based on that re-deployment, where encryption is enabled in an isolated network. Per block 708a, the streaming manager 140 will redeploy bottleneck or congestion operators to an isolated network. In one embodiment the isolated network will be a LAN network without connection to an external network, and with a security protocol that limits communication to and fro based on a specified security clearance provided by the user or a security protocol in the system. The stream manger 140, per block 708b, will update an operator graph 130 so that the exchange information amongst operators is in the same manner as prior to re-deployment. In one embodiment, the stream manager 140 can accomplish the proper configuration for communicating by using a relay device as shown by way of non-limiting example in FIG. 4D. Per block 712, block 714, and block 716 the encryption implementation component 242 or the stream manager itself 140 will reconfigure the encryption policy 236 to enable only a portion of tuples to be encrypted in association with the isolated node, i.e. 110E', within the isolated network 405', and the stream operator can designate an output of a single operator. i.e. OP12, as the sole data link where encryption will take place with respect to the network 405'. Accordingly, in one embodiment the portion of tuples to be encrypted by the cryptosystem 340, and per the encryption policy 236, will be at least partial tuple stream outputted from OP12, where OP12 is the sole operator associated with infringement. Alternative embodiments with respect to the particular encryption combinations were discussed above with reference to FIG. 4D, and those embodiments include scenarios where more than one operator is associated with encryption in the isolated network 405'.

The encryption step of 716 can be accomplished using various schemes, including but not limited to the technique discussed with respect to FIG. 5. In one embodiment, after an encrypted connection has been established, a first security key located on a compute node can encrypt, based on the encryption policy 236, at least a first set of values of a set of tuples. The associated (first) stream operator can then transmit the first set of values and another receiving (second) stream operator can receive the first set of values via the second encrypted connection. In some embodiments, the second stream operator is located on an a different compute node than the first stream operator and the compute node's security key that is associated with the second stream operator can decrypt, based on the encryption policy 236, the first portion of the first set of tuples received via the encrypted connection. For example, if the encryption policy 236 specified that every tuple should have its attribute A value encrypted, then the first compute node can encrypt a first quantity of attribute A values of a stream of tuples and transmit (e.g., via the first stream operator and encrypted connection) the first quantity to a second node (corresponding to a second stream operator). The second node can then decrypt, upon arrival, all of the first quantity for communicating with other processing elements or stream operators within the second node.

Various security keying systems and/or ciphertext encryption algorithms can be utilized in several embodiments when encryption is implemented by the cryptosy stem 340 or using another component in the system. For example, the encryption algorithm can be an asymmetric algorithm type, such as a Ribest-Shamir-Adleman (RSA), Diffie-Hellman (DH), Pretty Good Privacy (PGP) or other algorithms. The asymmetric algorithm can be utilized with asymmetric security keys. Asymmetric security keys can include private and public keys. Alternatively, the algorithm type can be a symmetric algorithm that is meant to be utilized with a symmetric security key. The symmetric algorithm can be any number of algorithms such as triple Data Encryption Standard (DES), International Data Encryption Algorithm (IDEA), Advanced Encryption Standard (AES), or other algorithms. For a symmetric security key algorithm, only one key is utilized to encrypt and decrypt tuple data. It is recognized that any suitable encryption policy 236 can be implemented for embodiments of the present disclosure, and the above were merely exemplary.

As stated above, the encryption policy 236 can be created by the user or alternatively it can be updated and/or generated by the streaming manager 140 or encryption implementation component 242 based on the criteria specified in the present application. In addition to the security concerns outlined above, various other conditions can exist that can require encryption to take place in an isolated network, such as 405', and in accordance with the scheme outlined in FIG. 7B. In some embodiments, the user or the encryption implementation component 236 can modify the encryption policy 236 to include a rule requiring that a particular set of values of one or more tuples is encrypted only when the particular set of values fall outside of a threshold (i.e., changes above or below a threshold). The threshold can correspond to a value point at which encryption (or decryption) is triggered for a particular set of values according to the encryption policy 236. The threshold can be any suitable value at which encryption is necessary. For example, a threshold value at which point encryption is implemented for any value of a tuple can be 10. Accordingly, if a particular value of a tuple changes from 9 to 10, the encryption policy 236 can cause the value that was unencrypted to now become encrypted because the threshold value of 10 was met. Therefore, in this example, any value equal to or greater than 10 falls outside of a threshold. Conversely, a threshold value can be any value that is below 9. Accordingly, if a value changes from 9 to 8, the value of 8 can be encrypted. Therefore, in this example, any value below 9 can be "outside" of a threshold of 9. In some embodiments, using this example, if the value of 8 changes a second time to 9, the value may not be "outside" of a threshold and therefore the value of 9 can be decrypted. These conditions can form the basis for requiring the operators to be re-deployed to isolated network 405', which permits partial encryption, and designating a single operator to receive the tuples associated with the conditions, process those tuples, and output the tuples via a link that will be encrypted by the cryptosystem 340 in accordance with the techniques discussed herein; or alternatively, these conditions can be a basis for requiring further encryption in the secure or isolated network 405'.

In some embodiments, the user, streaming manager 140, or encryption implementation component 242, can modify the encryption policy 236 to include a rule to encrypt tuples or values of tuples based on a particular time, such as a particular time of day or night. For example, the encryption policy 236 can include a rule to only encrypt each of a stream of tuples from 6 p.m. on a first day to 5 a.m. the next day. An encryption policy 236 can include a rule to encrypt tuples or values of triples based on a quantity of minutes (e.g., encrypting for 30 minutes), a calendar date (e.g., encrypt triples only on August $13^{th}$), a series of calendar dates, or any other time measurement. In embodiments, the particular time can be based on a time sequence associated with particular streams of tuples. For example, a near real-time video can be streamed and an encryption policy 236 can include a rule to only encrypt a first quantity of tuples that corresponds to a particular time sequence of the video. Again, these conditions can form the basis for requiring the operators to be re-deployed to isolated network 405', which permits partial encryption, and designating a single operator to receive the tuples associated with the conditions, process those tuples, and output the tuples via a link that will be encrypted by the cryptosystem 340 in accordance with the techniques discussed herein; or alternatively, these conditions can be a basis for requiring further encryption in the secure or isolated network 405'.

In some embodiments, the user, streaming manager 140, or encryption implementation component 242, can modify the encryption policy 236 to include a rule to encrypt tuples or values of tuples only when the tuples are associated with (e.g., are a part of) a particular stream computing application type. Particular stream computing application types within a stream computing environment can include sensor monitoring applications, network traffic analysis applications, financial tracking applications, online-auction applications, security threat detection applications, or any other types of suitable applications. A sensor monitoring application can include continually monitoring sensor data from an environment or subject (e.g., gathering near-real time biometric data from a heart rate monitor attached to a person). Network traffic analysis applications can include analyzing network traffic in near real-time. For example, these applications can generate statistics and detect critical conditions, such as monitor web logs, detect whether a particular server is appropriately load-balancing client requests, etc. Financial tracking applications can perform near real-time analysis of stock prices, identify financial trends, identify financial correlations, etc. Security threat applications can monitor a computing device in near real-time to determine whether malware has infected the computing device. Therefore, for example, an encryption policy 236 can include a rule to encrypt tuples when the tuples belong to an application that is a part of a security threat application, but not part of a network traffic analysis application. Again, these conditions can form the basis for requiring the operators to be re-deployed to isolated network 405', which permits partial encryption, and designating a single operator to receive the tuples associated with the conditions, process those tuples, and output the tuples via a link that will be encrypted by the cryptosystem 340 in accordance with the techniques discussed herein; or alternatively, these conditions can be a basis for requiring further encryption in the secure or isolated network 405'.

In some embodiments, the user, streaming manager 140, or encryption implementation component 242, can modify the encryption policy 236 to include a rule to encrypt tuples or values of tuples based on a particular user that accesses a streaming application and when the particular user accesses the streaming application one or more triples are encrypted. For example, a user can issue a request for financial tracking data. When the user's computing device establishes a connection with a server computing device associated with multiple processing elements and stream operators, the server computing device can obtain an IP address corresponding to the user's computing device. The server computing device can include a data store dedicated for storing particular IP addresses that are subject to an encryption policy 236. The encryption policy 236, for example, can include a rule to encrypt each and every tuple between all processing elements for the entire session associated with a particular IP address. In some embodiments, the encryption policy 236 can include a rule to encrypt tuples or values of tuples based on particular sensing data. For example, the encryption policy 236 can include a rule to encrypt tuples only when a sensor monitoring application includes receiving tuples from sensor X (which is located on person Y). Again, these conditions can form the basis for requiring the operators to be re-deployed to isolated network 405', which permits partial encryption, and designating a single operator to receive the tuples associated with the conditions, process those tuples, and output the tuples via a link that will be encrypted by the cryptosystem 340 in accordance with the techniques discussed herein; or alternatively, these conditions can be a basis for requiring further encryption in the secure or isolated network 405'.

In some embodiments, the user, streaming manager 140, or encryption implementation component 242, can modify the encryption policy 236 to include a rule to encrypt tuples or values of tuples based on or in conjunction with what else is running and/or who else is accessing data. For example, any tuples on machine B can be encrypted regardless of where it gets sent unless a particular user is the only user accessing the tuples. This can be useful, for example, in a cloud computing environment where multiple jobs can be run and certain resources are dedicated to particular users or applications. For example, a cloud computing environment can be running multiple jobs that are dedicated for a particular user and/or application. If resources are dedicated only for a particular user, encryption may not be implemented or preferable. However, once a particular machine starts getting shared with other users or applications, encryption can be implemented. Again, these conditions can form the basis for requiring the operators to be re-deployed to isolated network 405', which permits partial encryption, and designating a single operator to receive the triples associated with the conditions, process those tuples, and output the tuples via a link that will be encrypted by the cryptosystem 340 in accordance with the techniques discussed herein; or alternatively, these conditions can be a basis for requiring further encryption in the secure or isolated network 405'.

In some embodiments, the encryption policy 236 can be based on determining that a first stream operator outputs tuples to a second stream operator at a slower rate than a third stream operator outputs the same tuples to a fourth stream operator and encrypting the tuples only between the third operator and fourth stream operator but not between the first and second stream operator. The rate at which an operator outputs tuples make take into account at least two factors. First is the capacity of an operator to process a tuple. Second is the rate at which the operator receives tuples. For example, an operator with a processing capability to process one tuple a second but which only receives one tuple per minute can output one tuple per minute.

This encryption policy 236 can be based on the principle that establishing encrypted connections can take more processing time than establishing non-encrypted connections. Accordingly, if a particular upstream operator or set of operators processes tuples at a faster rate than a downstream operator or set of operators, the encryption policy 236 can be placed at the upstream operators or set of operators in order to not comprise the already-slow processing downstream operators. Moreover, if the upstream operator(s) have to wait anyway to transmit tuples to the downstream operator(s) because of the slow processing of the downstream operators), then it may not compromise the system to place the encryption policy 236 at the upstream operator(s). In an example illustration, a first stream operator can output one tuple every minute to a second operator. The second stream operator can output one tuple every minute to a third operator. However, the third operator can output one tuple every five minutes to a fourth operator. An appropriate latency evaluating component in the system, such as the stream manager 140, can determine this output rate, and update the encryption policy 236 to include a rule to encrypt only the tuples that flow between the first stream operator and second stream operator. In this example, the second operator can have to wait to send tuples to the third operator because of the third operator's slow processing time. The first stream operator and second stream operator can therefore establish an encrypted connection according to the encryption policy 236, which can take additional processing time. However, because the third stream operator can have to wait anyway to send tuples to the fourth stream operator, establishing the encrypted connection between the first and second stream operator may not compromise the overall flow processing time.

In some embodiments, the encryption policy 236 can be based on whether a sending or receiving stream operator has spare (i.e., additional, unused, unoccupied) processing capacity. "Spare processing capacity" can mean that a particular stream operator has the capacity to perform additional processing than what the stream operator is currently processing. Spare processing capacity can also refer to some amount of time that a processing element or operator can have available and use in place of waiting for a new tuple to process. This can be related to the "output rate" as described above. Determining whether a particular stream operator has spare processing capacity can be based on various factors such as comparing actual output/input rate of the stream operator (e.g., throughput) with bandwidth capacity of the stream operator, job load, processing time CPU cycles, and/or time of day, etc.

In various embodiments, the encryption policy 236 can be system or user-defined. For example, a user can issue a command to the system (e.g., management system 10 of FIG. 1), which specifies a desired encryption policy 236 for each of the compute nodes to utilize. These encryption policies can be any of the encryption policies discussed above, or any other encryption policy 236. In another example, the system (e.g., stream manager 140 105 of FIG. 1) can generate or select an encryption policy 236 and distribute the encryption policy 236 to each compute node without a user request. In other embodiments, as stated, the encryption implementation component 242 can re-configure the encryption policy 236.

Figure 8:
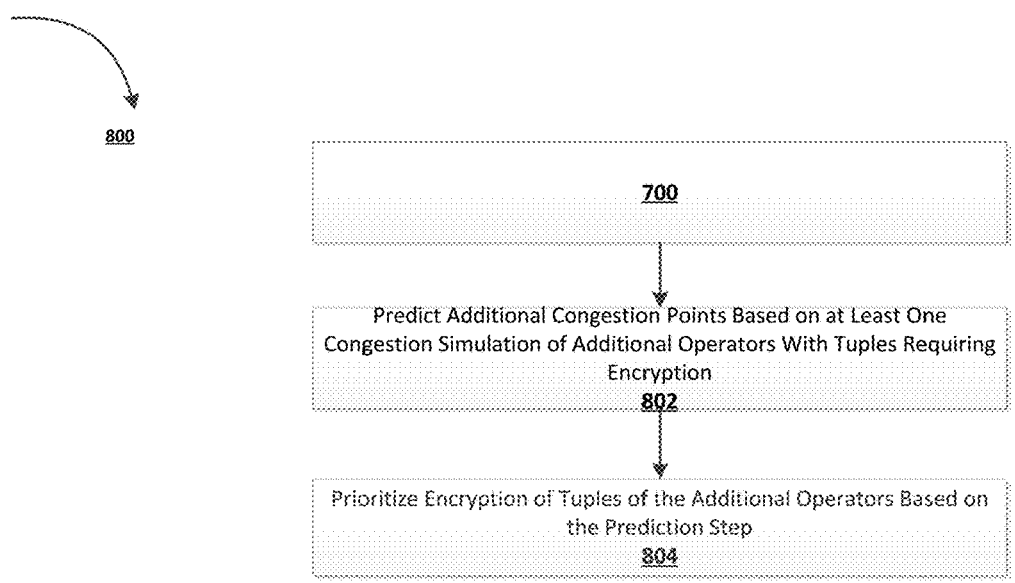
FIG. 8 is a flow diagram of an example process for applying an encryption policy and maximizing efficiency of a streaming system that employs encryption according to one embodiment described herein.

FIG. 8 is a flow diagram of an example process 700 for predicting latency associated with encryption and redeploying resources, including operators, according to the encryption policy 236, consistent with embodiments discussed herein. As shown, at block 802, the user or congestion management component 34 predicts multiple congestion points in the computing by running simulations on the system 100 to determine additional operators that are associated with a congestion point or bottleneck. Per block 804, the user or congestion management component 340 can also update the encryption policy 236 based on the results of the simulations, i.e. determining how to prioritize encryption based on latency effects revealed by the simulations. According to one embodiment, a processing time constraint can be specified by the user. If operators fall within the processing time constraint, encryption can continue as designated by the encryption policy 236; otherwise, the user or streaming manager 140 can instruct the re-deployment of the operators outside the processing time constraint according to the scheme of FIG. 4B or FIG. 4C, i.e. all the operators that are encrypted but fail the processing time constraints would be moved to nodes in an isolated network 405, where encryption does not occur, and other security measures, as discussed above, are employed. Alternatively, if encryption is still required for the information contained in the operators falling outside the processing time constraint, the scheme according to FIG. 4D can be employed, i.e. the streaming manager 140 or user would move all of the operators to network 405', and would designate a single operator as the operator that will be associated with encryption.

According to certain embodiments, the user or congestion management component 345 would run the simulations and processing techniques to predict congestion points, such as by accounting for stream-based applications being processed data in real time. In this instance, a user or congestion management component 345 can specify a particular minimum amount of time in which tuples must be processed. For example, a user can specify that each tuple in a data stream must be processed in no more than one millisecond or no more than 100 microseconds. The time constraint will vary depending on the application. The processing time constraint can be expressed in terms of path or operator graph travel times and it can account for how much time facilitating encryption for a stream operator, at a point of congestion, bottleneck or generally can take, i.e. a delay of 5 ms and a consumption of x amount of computer power. This can be added to a pre-determined time constraint, i.e. the operator processing or inter-operator communication time may be within limits, but the cost of encryption may put it over the threshold. Thereafter, the user or congestion management component 345 can specify conditions that relate to the operation of particular elements of the operator graph. This can include specifying: (1) the manner in which stream operators and processing elements simulate processing; (2) whether particular parts (stream operators, processing elements, compute nodes, and links) of the operator graph are on or off during simulated processing, (3) whether the stream operators implement encryption because of a security vulnerability, such as communicating with an external network, and how much time such encryption will take, (4) the degree of the security vulnerability, and (5) other pertinent parameters that relate to functional aspects of an operator graph. The manner in which stream operators and processing elements simulate processing can include: (a) whether a stream operator or processing element performs operations that can affect a network, e.g., opening a network socket; (b) conditions for sorting or routing tuples at a stream operator or processing element; (c) the size and number of tuples output by a stream operator or processing element in response to receiving an input tuple; (d) how a stream operator or processing element simulates processing, e.g., processing times, retransmission timer values; (e) conditions under which a stream operator or processing element sheds tuples; (f) whether and how a stream operator or processing element groups tuples for transmission; (g) if encryption is implemented for a particular stream operator, and what latency the encryption will introduce and/or computer resources consumed to facilitate the encryption. If operators meet the timing or latency conditions or the other delineated conditions, the user or streaming manager 140 can instruct the re-deployment of the operators outside the processing time constraint according to the scheme of FIG. 4B or FIG. 4C, i.e. all the operators that meet the conditions would be moved to nodes in an isolated network 405, where encryption does not occur, and other security measures, as discussed above, are employed. Alternatively, if encryption is still required for the information contained in the operators that fall within the conditions, the scheme according to FIG. 4D can be employed, i.e. the streaming manager 140 or user would move all of the operators to network 405', and would designate a single operator as the operator that will be associated with encryption.

In order to execute the simulation, the user or stream manager 140 can specify a particular operator graph configuration to determine whether a latency or other condition is met. For example, a simulation condition that part of an operator graph is to be off during simulated processing specifies a particular operator graph configuration. As another example, a simulation condition that a stream operator is to sort or route tuples according to a specified criteria during simulated processing specifies a particular operator graph configuration.

The streaming manager 140 or user can run simulations using different routing or sorting criteria as provided directly. For example, PE1 can split a received stream according to a sorting criterion specified by the user. For instance, PE1 can route tuples according to the alphabetical value of a particular attribute, such that tuples having a particular attribute that begins with: (a) a-h are routed to PE2 and (b) i-o are routed to PE3. A first simulation can be conducted with tuples being routed by PE1 according to this criterion. The routing criterion of PE1 can be modified and a second simulation conducted with the test stream being routed by PE1 according to the modified criterion. For example, the user, streaming manager 140 can determine or modify PE1 routing criteria so that tuples having a particular attribute that begins with: (a) a-e are routed to PE3 (not shown), and (b) f-m are routed to PE4 (not shown). Routing criteria can be modified at one or more processing elements by the streaming manager 140, the application verifier 340 or a user. In one embodiment, simulations are conducted using two or more different routing criteria. By conducting simulations using various routing criteria, a bottleneck that occurs when using particular routing criteria can be identified or predicted by the user or streaming manager, and then form the basis for prioritizing encryption as discussed above In performing a prediction of bottlenecks throughout the system and prioritizing encryption based on the prediction, the streaming manager 140 can employ metadata. In various embodiments, operator metadata can be specified to configure a stream operator to not process the tuples it receives, but instead to simulate processing. Optionally, to accomplish the prediction of block 802, and make the determinations as to whether any of the above conditions, latency or otherwise, are satisfied and warrant re-deployment, and thus prioritize encryption per block 804, the user, streaming manager 140 or application verifier 350 can set parameters or metadata that specify how processing is to be simulated, including configuring stream operators according to certain conditions. For example, a stream operator can be configured to output a particular number of tuples for every tuple received. As another example, a stream operator can be configured to output one or more tuples following receiving an input tuple after a particular time delay. For example, a processing element or stream operator can receive a tuple, hold the tuple for 5 ms, and then transmit a corresponding tuple to another stream operator without performing any processing. A stream operator can be configured to set a particular attribute value of a received tuple to a default value. A stream operator that sorts tuples, routing input tuples to one of two or more other stream operators according to a condition. A stream operator that transmits tuples on link can be configured to group and send two or more tuples as a group in a single transmission rather than transmitting each tuple individually. A stream operator that includes a timer, such as a retransmission timer, can have its time limit set in as well.

Additionally, in order to predict latency and predict bottlenecks per block 802, the stream manager 140 or user can introduce test data at any point in the operator graph. The test data can be data, e.g., a stream of tuples that facilitates simulation of a stream-based computing application in a way that isolates network effects. In one embodiment, the test data can include a tuple with attribute values that cause the processing element or stream operator to omit processing of the tuple. For example, a particular attribute of a tuple can be all nines or all zeros. In another embodiment, the test data can also contain a runtime flag to indicate that the processing element or stream operator can omit processing of the tuple. In yet another embodiment, metadata for the stream operators are specified so that the operators are configured to treat all tuples received as teat data without regard to data value. In general, test tuples can be sized to simulate actual or predicted network or bus traffic. For example, if triples transmitted on a particular link are expected to be 64 bytes, test tuples transmitted on this link during simulation can be 64 bytes. Additionally, a test tuple can be "passed through" a stream operator or processing element, meaning that the test tuple is not processed or only limited processing is performed on the test tuple. As mentioned, operator metadata can be specified to configure a stream operator to not process the triples it receives or to configure an operator to perform limited processing.

In another embodiment, the user or streaming manager can assess data from processing elements or stream operators, which can periodically send monitoring data to the stream manager 140 or application verifier 350, in order to predict or determine if a bottleneck will occur or is occurring in the system. For example, a test tuple can include an identifier so that a first processing element can notify the stream manager 140 that a particular test tuple was output at a first time and a second processing element can notify the stream manager 140 that the test tuple was received at a second time. This monitoring data from the first and second processing elements can be used by the stream manager 140 to determine how long the particular test tuple took to travel from the first processing element to the second processing element, i.e., path travel time. If the path travel time exceeds a certain threshold exceeds a certain threshold, then the operators associated therewith will be re-deployed to an isolated network with disabled encryption or partial encryption, in accordance with the embodiments described herein, and in order to balance latency issues stemming from encryption and security concerns.

In an alternative embodiment, the congestion management component 340 can add a time stamp can be added to a particular test triple at a first operator and a second operator that receives the tuple, and can inspect the time stamp to determine travel time. In this alternative, the congestion management component 340 can periodically poll the second processing elements to determine path travel time. In these embodiments, the first and second stream operators can be directly coupled by an inter-stream operator communication path or link, indirectly coupled via two or more inter-stream operator communication paths or links or via one or more processing elements, or via both plural inter-stream operator communication paths or links and processing elements. In one embodiment, path travel time can be an average. For example, the times taken for one million tuples to travel a particular path can be averaged to produce an average path travel time. In addition, the path travel times for all paths in an operator graph can be combined to generate an operator graph travel time. Again, if the path travel time exceeds a certain threshold exceeds a certain threshold, then the operators associated therewith will be re-deployed to an isolated network with disabled encryption or partial encryption, in accordance with the embodiments described herein, and in order to balance latency issues stemming from encryption and security concerns.

Per Block 804, in one embodiment, the user, streaming manager 140 can prioritize encryption based on the predictions results as outlined above. The streaming manager 140 or application verifier 350 will compare a desired travel time, an average operator graph travel time, desired computer resource or power usage, or other similar metric to a processing constraint, including a time constraint or power constraint, as discussed above. If the user, streaming manager 140 or application verifier 350 determine that operator graph travel time or power usage is outside of the constraint, e.g., travel time is greater than the time constraint, it can be inferred that the operator graph is unable to handle the specified workload given the desired conditions. On the other hand, if operator graph travel time is within the processing time constraint, e.g., travel time is less than the time constraint, it can be inferred that the operator graph is capable of handling the specified workload in the time allowed. Based on these determinations, the streaming manager 140 can re-deploy the entire operator graph according and update the encryption policy 236 as to where encryption will be carried out, and as such, it can prioritize encryption for the whole system based on the prediction or simulation results.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used to addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of prioritizing encryption for a stream computing application having a plurality of stream operators, the computer-implemented method comprising:
 monitoring the plurality of stream operators within a stream computing environment to collect performance data, wherein the stream computing application has a processing overhead and a measure of security;

identifying a point of congestion within the stream computing environment, based on one or more values within the collected performance data satisfying a predefined congestion condition;

determining one or more stream operators of the plurality of stream operators associated with the identified point of congestion;

reducing the processing overhead while preserving the measure of security, by operation of one or more computer processors by: redeploying the one or more stream operators to an isolated network within the computing environment and modifying an encryption policy for the stream computing environment to disable one or more encryption operations on the redeployed one or more stream operators; and generating a result by executing the stream computing application having the disabled one or more encryption operations on the redeployed one or more stream operators, wherein the stream computing application is executed with the reduced processing overhead and the preserved measure of security, whereafter the result is output.

2. The computer-implemented method according to claim 1, wherein the one or more stream operators are deployed on a first network when the point of congestion is identified, and wherein the redeploying the one or more stream operators to an isolated network within the computing environment further comprises:

redeploying the one or more stream operators from the first network to a local area network (LAN) network that is distinct from the first network; and updating an operator graph containing the one or more stream operators based on the deployment to the LAN network.

3. The computer-implemented method according to claim 2, wherein prior to the redeployment, at least one portion of a stream of tuples of the one or more of stream operators was encrypted.

4. The computer-implemented method according to claim 1, wherein, prior to the redeployment, at least one portion of an input stream of tuples of the plurality of stream operators was encrypted, and wherein the computer-implemented method further comprises:

enabling encryption operations for only a portion of tuple streams associated with the one or more stream operators.

5. The computer-implemented method according to claim 1, further comprising:

predicting a plurality of additional congestion points in the computing environment based on at least one congestion simulation of the operator graph before implementing the encryption policy; and prioritizing encryption of all tuples implementing encryption in the computing environment based on the prediction.

6. The computer-implemented method according to claim 1, wherein the measure of security is preserved via the isolated network, wherein the processing overhead is reduced via the disabled one or more encryption operations, wherein the point of congestion is determined automatically, wherein the one or more stream operators are deployed on a first network when the point of congestion is identified.

7. The computer-implemented method according to claim 6, wherein the redeploying the one or more stream operators to an isolated network within the computing environment further comprises:

redeploying the one or more stream operators from the first network to a local area network (LAN) network that is distinct from the first network; and updating an operator graph containing the one or more stream operators based on the deployment to the LAN network.

8. The computer-implemented method according to claim 7, wherein prior to the redeployment, at least one portion of a stream of tuples of the one or more of stream operators was encrypted, wherein the computer-implemented method further comprises:

enabling encryption operations for only a portion of tuple streams associated with the one or more stream operators.

9. The computer-implemented method according to claim 8, further comprising:

designating a single computer node connected to the isolated network for enabling all encryption operations per the encryption policy, wherein at least one of the one or more stream operators is designated for receiving an input stream of tuples, wherein a portion of which will be encrypted as an output stream of tuples in the computer node.

10. The computer-implemented method according to claim 9, further comprising:

encrypting the at least one output stream of tuples pursuant to the modified encryption policy;

predicting a plurality of additional congestion points in the computing environment based on at least one congestion simulation of the operator graph before implementing the encryption policy; and prioritizing encryption of all tuples implementing encryption in the computing environment based on the prediction.

11. A system of prioritizing encryption for a stream computing application having a plurality of a stream operators, the system comprising:

a computing device having one or more computer processors; and a computer-readable storage medium having program instructions embodied therewith, the program instructions executable by the one or more computer processors to cause the system to:

monitor the plurality of stream operators within a stream computing environment to collect performance data, wherein the stream computing application has a processing overhead and a measure of security;

identify a point of congestion within the stream computing environment, based on one or more values within the collected performance data satisfying a predefined congestion condition;

determine one or more stream operators of the plurality of stream operators associated with the identified point of congestion;

reduce the processing overhead while preserving the measure of security, by: redeploying the one or more stream operators to an isolated network within the computing environment and modifying an encryption policy for the stream computing environment to disable one or more encryption operations on the redeployed one or more stream operators; and generate a result by executing the stream computing application having the disabled one or more encryption operations on the redeployed one or more stream operators, wherein the stream computing application is executed with the reduced processing overhead and the preserved measure of security, whereafter the result is output.

12. The system of claim 11, wherein, prior to the redeployment, at least one portion of a stream of tuples of the one or more of stream operators was encrypted.

13. The system of claim 11, wherein prior to the redeployment, at least one portion of an input stream of tuples of the plurality of stream operators was encrypted, and wherein the program instructions further cause the system to:
enable encryption operations for only a portion of tuple streams associated with the one or more stream operators.

14. The system according to claim 13, wherein the program instructions further cause the system to:
predict a plurality of additional congestion points in the computing environment based on at least one congestion simulation of the operator graph before implementing the encryption policy; and
prioritize encryption of all tuples implementing encryption in the computing environment based on the prediction.

15. A computer program product comprising a computer readable storage medium having program instructions embodied therewith, the program instructions executable to perform an operation to prioritize encryption for a stream computing application having a plurality of stream operators, the operation comprising:
monitoring the plurality of stream operators within a stream computing environment to collect performance data, wherein the stream computing application has a processing overhead and a measure of security;
identifying a point of congestion within the stream computing environment, based on one or more values within the collected performance data satisfying a predefined congestion condition;
determining one or more stream operators of the plurality of stream operators associated with the identified point of congestion;
reducing the processing overhead while preserving the measure of security, by operation of one or more computer processors when executing the program instructions, and by: redeploying the one or more stream operators to an isolated network within the computing environment and modifying an encryption policy for the stream computing environment to disable one or more encryption operations on the redeployed one or more stream operators; and
generating a result by executing the stream computing application having the disabled one or more encryption operations on the redeployed one or more stream operators, wherein the stream computing application is executed with the reduced processing overhead and the preserved measure of security, whereafter the result is output.

16. The computer program product of claim 15, the operation further comprising:
redeploying the one or more stream operators from the first network to a local area network (LAN) network that is distinct from the first network; and
updating an operator graph containing the one or more stream operators based on the deployment to the LAN network.

17. The computer program product of claim 16, wherein prior to the redeployment, at least one portion of a stream of tuples of the one or more of stream operators was encrypted.

18. The computer program product of claim 15, wherein, prior to the redeployment, at least one portion of an input stream of tuples of the plurality of stream operators was encrypted, and wherein the operation further comprises:
enabling encryption operations for only a portion of tuple streams associated with the one or more stream operators.

19. The computer program product of claim 18, the operation further comprising:
designating a single computer node connected to the isolated network for enabling all encryption operations per the encryption policy, wherein at least one of the one or more stream operators is designated for receiving an input stream of tuples, wherein a portion of which will be encrypted as an output stream of tuples in the computer node.

20. The computer program product according to claim 15, the operation further comprising:
predicting a plurality of additional congestion points in the computing environment based on at least one congestion simulation of the operator graph before implementing the encryption policy; and
prioritizing encryption of all tuples implementing encryption in the computing environment based on the prediction.

\* \* \* \* \*